US011900451B1

(12) United States Patent
King et al.

(10) Patent No.: US 11,900,451 B1
(45) Date of Patent: Feb. 13, 2024

(54) GENERATING CREDIT BUILDING RECOMMENDATIONS THROUGH MACHINE LEARNING ANALYSIS OF USER ACTIVITY-BASED FEEDBACK

(71) Applicant: Chime Financial, Inc., San Francisco, CA (US)

(72) Inventors: Ryan Alexander King, San Francisco, CA (US); Michael Ducker, San Francisco, CA (US); Tilo Sloboda, San Jose, CA (US); Zachary Vaughn Smith, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 17/021,939

(22) Filed: Sep. 15, 2020

Related U.S. Application Data

(60) Provisional application No. 62/901,054, filed on Sep. 16, 2019.

(51) Int. Cl.
*G06Q 40/03* (2023.01)
*G06N 20/00* (2019.01)

(52) U.S. Cl.
CPC ............. *G06Q 40/03* (2023.01); *G06N 20/00* (2019.01)

(58) Field of Classification Search
CPC ............. G06Q 20/025; G06Q 40/025; G06Q 40/00–03; G06N 20/00

USPC .......................................................... 705/38
See application file for complete search history.

(56) References Cited

U.S. PATENT DOCUMENTS

| | | | | |
|---|---|---|---|---|
| 7,899,750 | B1* | 3/2011 | Klieman | G06Q 40/02 705/40 |
| 9,830,646 | B1* | 11/2017 | Wasser | G06F 3/0412 |
| 11,042,904 | B1* | 6/2021 | Gratz | G06Q 30/0267 |
| 2014/0114735 | A1* | 4/2014 | Isaacson | G06Q 20/42 705/26.7 |
| 2016/0027102 | A1* | 1/2016 | Smith | G06Q 40/00 705/35 |
| 2018/0040064 | A1* | 2/2018 | Grigg | H04L 41/147 |
| 2018/0075527 | A1* | 3/2018 | Nagla | G06F 21/6218 |
| 2019/0087745 | A1* | 3/2019 | Kurian | G06N 20/00 |
| 2020/0380610 | A1* | 12/2020 | Lopez | H04W 4/12 |

* cited by examiner

*Primary Examiner* — Eric T Wong
(74) *Attorney, Agent, or Firm* — Keller Preece PLLC

(57) ABSTRACT

A real-time activity recommendation system receives an input from a user device regarding a targeted financial goal, such as a target credit score. Using machine learning models to evaluate patterns of user activity that contribute positively towards the goal, and to evaluate the limitations and opportunities of the user's financial circumstances and profile, the recommendation system makes an assessment in real time to determine user actions that can be taken to improve credit health based on a user's profile and activity data. A user-specific recommendation regarding an activity that should be performed to reach the goal is generated and transmitted to the user. User and third party activity is later monitored as the user's financial status changes over time, and the recommendations are updated accordingly.

18 Claims, 12 Drawing Sheets

FIG. 9B

GENERATING CREDIT BUILDING RECOMMENDATIONS THROUGH MACHINE LEARNING ANALYSIS OF USER ACTIVITY-BASED FEEDBACK

This application claims priority to U.S. Provisional Patent Application No. 62/901,054 entitled "Modifying Credit Builder Recommendations Through User Activity-Based Feedback" and filed on Sep. 16, 2019, the content of which is incorporated by reference herein.

BACKGROUND

Modern financial institutions and their clients conduct the vast majority of their financial transactions through digital channels. Modern day consumers have access to a variety of tools, both digital and non-digital, that allow them to build credit, such as secured credit cards. A good credit score can help consumers negotiate loans at favorable rates and otherwise provides greater financial flexibility. However, the particular manner in which these credit building tools must be used to actually improve a consumer's credit score is determined by various credit bureaus; consumers are often not provided with clear knowledge as to how their use of the tools, or their own activity, directly or indirectly affects their credit scores. As a result, even well-intentioned consumers often use these credit tools in a disadvantageous or suboptimal manner. Therefore, automated, digitally-focused solutions that facilitate positive credit activity without increasing workload to financial institutions are generally desired.

BRIEF DESCRIPTION OF THE DRAWINGS

The disclosed embodiments have other advantages and features that will be more readily apparent from the detailed description, the appended claims, and the accompanying figures (or drawings). The disclosure can be better understood with reference to the following drawings. The elements of the drawings are not necessarily to scale relative to each other, emphasis instead being placed upon clearly illustrating the principles of the disclosure.

FIGS. 9A, 9B, and 9C illustrate exemplary user interfaces for accessing a service that provides activity recommendations to clients, in accordance with some embodiments of the present disclosure.

Figure 1:
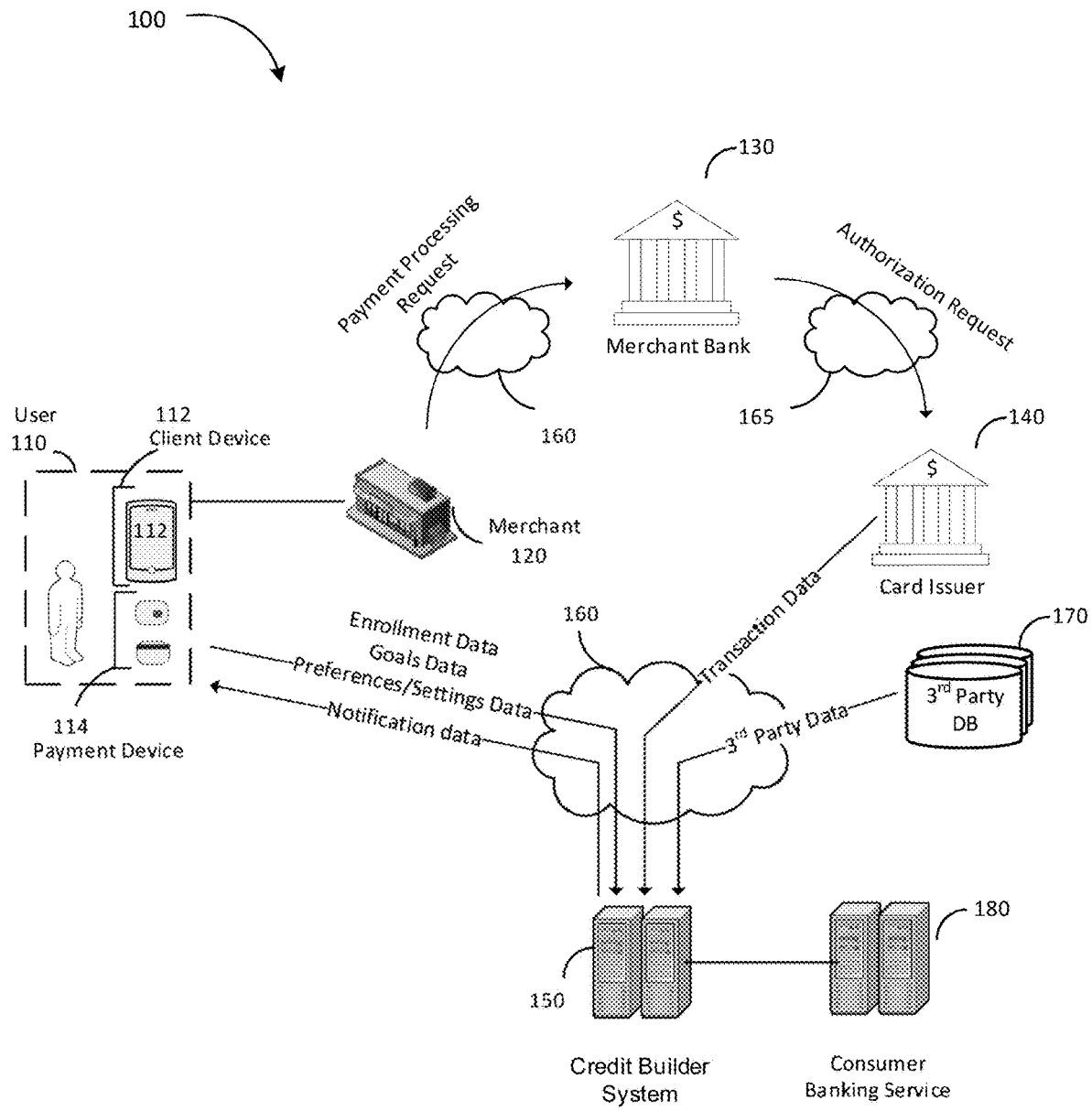
FIG. 1 is a diagram illustrating an environment including a credit builder system for providing activity recommendations to clients based on feedback from machine learning models in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The present disclosure generally pertains to the field of machine learning, and more particularly to systems and methods for applying machine learning models to generate recommendations to a user for achieving a financial goal that is dependent on reaching a particular credit score. In an exemplary embodiment, a credit building system collects information from a user (e.g., goal information, account information, profile information), information regarding user activity, and financial information from a third party (e.g., credit score information). The credit building system makes an assessment in real time to determine potential user actions that can be taken to improve credit health using the collected data and generates, based on that assessment, a recommendation to provide to the user regarding at least one activity that should be performed to reach the goal.

In an exemplary embodiment, the assessment of the user's data (e.g., profile and activity data) is performed through the application of one or more machine learning models trained on data representative of improving credit score. For example, the machine learning models may identify and cluster other consumers (or consumer accounts) with similar characteristics to the user and identify one or more actions performed by those users that have led the consumers to meet or approach the user's stated goal. In some embodiments, one or more machine learning models or algorithms may be applied to prioritize and/or filter these identified actions based on user preferences, ability, and/or history. The system may then consolidate these actions into one or more recommendations to help the user meet their stated goal, and transmit the recommendations to the user over a digital channel (e.g., mobile phone application). In some embodiments, where the credit builder system observes a likelihood that the user will engage in activity that is damaging to the user's goals (e.g., a wasteful expenditure, or a loan the user is unlikely to be able to repay), the system may alert the user to advise the user to avoid engaging in such activity.

As one example, the user may be consumer having an account for a credit building tool such as a secured credit card. A scenario may exist in which the user indicates to the credit building system that they want to purchase a house by next year. The user's current credit score is a 540, while the purchase of a house generally requires a credit score of 580. In this exemplary scenario, the credit building system may recommend particular activity that would lead to a credit score improvement of 50 points within a predetermined time period, e.g., within the next year or a time period set by the user. Such recommended activity may include, for instance, devoting a certain amount of money to a secured charge card to establish a credit limit that would be viewed favorably by credit bureaus. As the user engages in future activity, such as making purchases, experiencing changes in income, and the like, data is collected on the user's activity, as well as relevant third party activity. The credit building system may monitor this activity information (and updates thereto) and, based on outputs of one or more machine learning models, may recommend different or further recommendations for achieving the user's stated goal. Of course, the credit scores, goals, and/or other activities discussed above are merely exemplary, and other embodiments may receive, process, and/or suggest different information and activities.

In some embodiments, an automated rules-based implementation is applied to reward users for meeting or approaching their stated goals. For instance, a predetermined or dynamically determined threshold for a credit score improvement may be set (e.g., an increase of ten points in a user's credit score), and that the user's progress against such threshold is tracked through automated means. When the threshold is met, a financial or experiential reward may be provided to the user. As just one example of a reward, the system may initiate an ACH transaction in which a certain dollar value is deposited in the user's account. In alternate embodiments, rather than a threshold value, the system may reward a certain amount of value to the user based on their execution of credit building activity targeted towards the user's personalized goals, e.g., when the user follows the credit builder system's recommended actions. By these means, the systems and methods described herein may provide customers with personalized feedback to identify and incentivize financial health that is rewards-based, separate from or in addition to other reports or notifications that might be sent.

In some embodiments, through analysis of digital information on a client device, the credit builder system may handshake with third-party applications or software on a user's device to determine specific, actionable income sources that offer additional income capabilities to the user. In such an embodiment, the decision to recommend or prompt the user to use the third-party application is based on information determined by retrieving information from entities (e.g., a bank's database showing a checking account ledger, or a loan provider's database showing new loan information), where the prompt is output in a case where the user needs additional income, and the particular application is selected based on the amount needed. Accordingly, third-party application information on the client device is leveraged to tailor recommendations for the user based on opportunities for additional income streams.

FIG. 1 depicts, in accordance with some embodiments of the present disclosure, an environment 100 including a credit builder system 150 for providing credit-building activity recommendations to users based on feedback from machine learning models. As illustrated, environment 100 may include one or more users 110 (also variously referred to herein as customers, clients, or consumers) who may open an account with the owner of a credit builder system 150. In an exemplary embodiment, the entity that owns or manages the credit builder system 150 is a financial entity, such as a consumer banking service 180 for managing the user's financial account associated with the user's payment device 114. The consumer banking service 180 may also manage one or more user-facing systems. User 110 may, via a dedicated application (app) or website accessed on their mobile device 112 (described in greater detail below with reference to FIG. 2), be a user of such a user-facing system, such that user 110 can interact with the consumer banking service 180 and credit builder system 150, for example to check or manage account status, make deposits or withdrawals, and the like.

The user 110 may be capable of initiating one more payment transaction using a payment device 114 (e.g., a secured credit card) associated with the consumer's bank account, or, in some embodiments, more than one bank account. Payment device 114 may be any of, for example, a payment card having a magnetic strip that is swiped in a magnetic reader of a payment reader, a payment device having a Europay/MasterCard/Visa (EMV) chip that is inserted into a corresponding EMV slot of a payment reader (e.g., a secured charge card, credit or debit card, a gift card, a proxy card, etc.), and near field communication (NFC) enabled devices such as a smartphone or EMV card that is tapped at a payment reader and that transmits payment information over a secure wireless connection.

As illustrated, environment 100 may also include one or more merchants 120. The term "merchant" may be understood to encompass any business or other entity that sells, leases, or otherwise provides goods or services to user 110 as part of a financial transaction, an ATM or other device/system with a cash-back function, a bill pay system (e.g., system for sending checks, wires), an automated clearing house (ACH), a party to one or more peer-to-peer payments, or any other entity or representative party or object engaging in a payment transaction with the user 110. In an exemplary embodiment, merchant 120 may use one or more devices capable of taking in payment information related to the user 110's payment device 112.

When a transaction between the merchant 120 and user 110 is initiated through the swipe/insertion/tap/input of the payment device 114 or the input of information, a merchant may send a request to process the payment to the merchant's acquiring bank 130. Merchant bank 130 may be made up of one or more bank servers. Merchant bank 130 sends the transaction to a card issuer system 140 of the payment device for authorization or approval of the transaction. Card issuer system 140 (also referred to herein as an "issuing bank") may include any number of computing servers that manage the payment networks on which the payment device 112 works. The card issuer system 140 may transmit information regarding user 110's purchase transactions to the credit builder system and/or the consumer banking service 180, either as a routine matter or upon request by the credit builder system 150.

Credit builder system 150 offers a service that provides, to the user 110, ongoing feedback to assist the user in achieving financial goals communicated to credit builder system 150. Credit builder system 150 may accept inputs from user 110 about their financial goals (in addition to other information) via client device 112 (described with reference to FIG. 2), and may additionally pull information from third-party databases 140. This information is used to compute a recommended course of action for the user to achieve the specified goals. For instance, credit builder system 150 may recommend to the user 110 to maintain a credit limit of $1,500 and/or to open a car loan to elevate the user's credit score on the desired timeline to that necessary to buy a home. Credit builder system 150 may, from that point forward, continually monitor the financial state of the user 110 as well as changes to the user's credit score over time, and may feed learned information back to a model to reassess the financial health of the user and, if needed, revise or replace the recommendation(s) provided to the user.

In one exemplary embodiment, credit builder system 150 is configured to provide the user with services, such as a credit line in the form of a secured charge card. The term secured charge card, as used herein, is a vehicle where a user transfers a certain sum of money, or an asset valued at a certain sum of money, to credit builder system 150, and credit builder system 150 provides the user with a credit limit equal to, or that is based on, the certain sum of money. This enables users to build credit by maintaining a credit limit that may not be accessible to the users through traditional credit cards, where credit builder system 150 has secured the credit limit with money or assets. Moreover, a secured charge card is accessible to people with poor credit, as no credit score is required to qualify because the debt is fully secured. The secured charge card may be a physical or virtual card (in some embodiments, payment device 114). As money is spent, the credit limit is reduced, and as money is replenished or otherwise added, the credit limit is increased. Where the term "money" is used herein, it is used merely for convenience, and any asset associated with a value denomination may apply, e.g., cryptocurrency or precious metal quantity. Further details about the secured charge card are described below with respect to FIG. 8

Third party databases 170 may be one or more databases variously storing the user's current credit score, credit history, information that impacts the user's credit score, and credit scores and/or relevant information for a plurality of other consumers. In some embodiments, credit builder system 150 may request authorization from client device 112 to access confidential information of the user that is stored at one or more of third party databases 170, such as the user's credit score. Where the information is publicly accessible, credit builder system 150 may access the publicly accessible information from third party databases 170 to further inform a recommendation to be provided to the user.

The components of environment 100 may communicate with each other over a communication network 160. Although communication network 160 may be any suitable communication network, in one embodiment, communication network 160 is the Internet and payment and transaction information may be communicated in an encrypted format such by a transport layer security (TLS) or secure socket layer (SSL) protocol. In addition, when the network 160 is the Internet, any of the components of environment 100 may use the transmission control protocol/Internet protocol (TCP/IP) for communication. In some embodiments, merchant bank 130 may communicate with the card issuer system 140 via one or more payment card networks 165, e.g., a network managed by an entity such Visa, Mastercard, American Express, Discover, or any other similar card networks.

It will be understood that while, for ease of illustration, FIG. 1 depicts one user 110, one payment device 114, one client device 112, one merchant 120, one merchant bank 130, one card issuer system 140, one credit builder system 150, one consumer banking service 180, and a plurality of third party databases 170, environment 100 is not limited to that configuration. In various implementations, any number of merchants, users, banks, services, or devices may be used in any number of configurations. Further, while FIG. 1 illustrates a card or NFC based payment device used with a merchant, other embodiments may exist where any device associated with a financial account may be used in any transaction involving the deduction of funds from that financial account (whether or not initiated by a merchant), e.g., transactions conducted at an ATM, a merchant cash register, or other device permitting a cash-back function), bill pay, checks, wires, automated clearing house (ACH), peer-to-peer payments.

A client device 112 (which in some embodiments, may also act in whole or in part as payment device 114) may be, for instance, a mobile telephone or smartphone such as an iPhone or Android device, an iPad or tablet device, a laptop or touchscreen device, a PC or stationary computing device, a web appliance, a network router, switch or bridge, or any other practical machine that can communicate via a communication network 160 and is capable of executing instructions (sequential or otherwise) that specify actions to be taken by that device. User 110 can use their device 112 to access, view, and/or take action in response to delivered content. In an exemplary embodiment, the client device 112 presents information to a user via a display on or connected to the device 112, and takes input from the consumer in relation thereto (for example, through interactive graphics or hyperlinks) via a touchscreen, mouse, keyboard, stylus, or any other appropriate input device. For example, device 112 may be capable of receiving and displaying notification data via a dedicated application (app) or website, email, instant messaging, voice, SMS, voicemail, or any other appropriate type of communication. While only a single element 112 is illustrated in FIG. 1, the device may be generally understood to be a machine, where the term "machine" shall also be taken to include any collection of machines that individually or jointly execute instructions to perform any one or more of the methodologies discussed herein.

Figure 2:
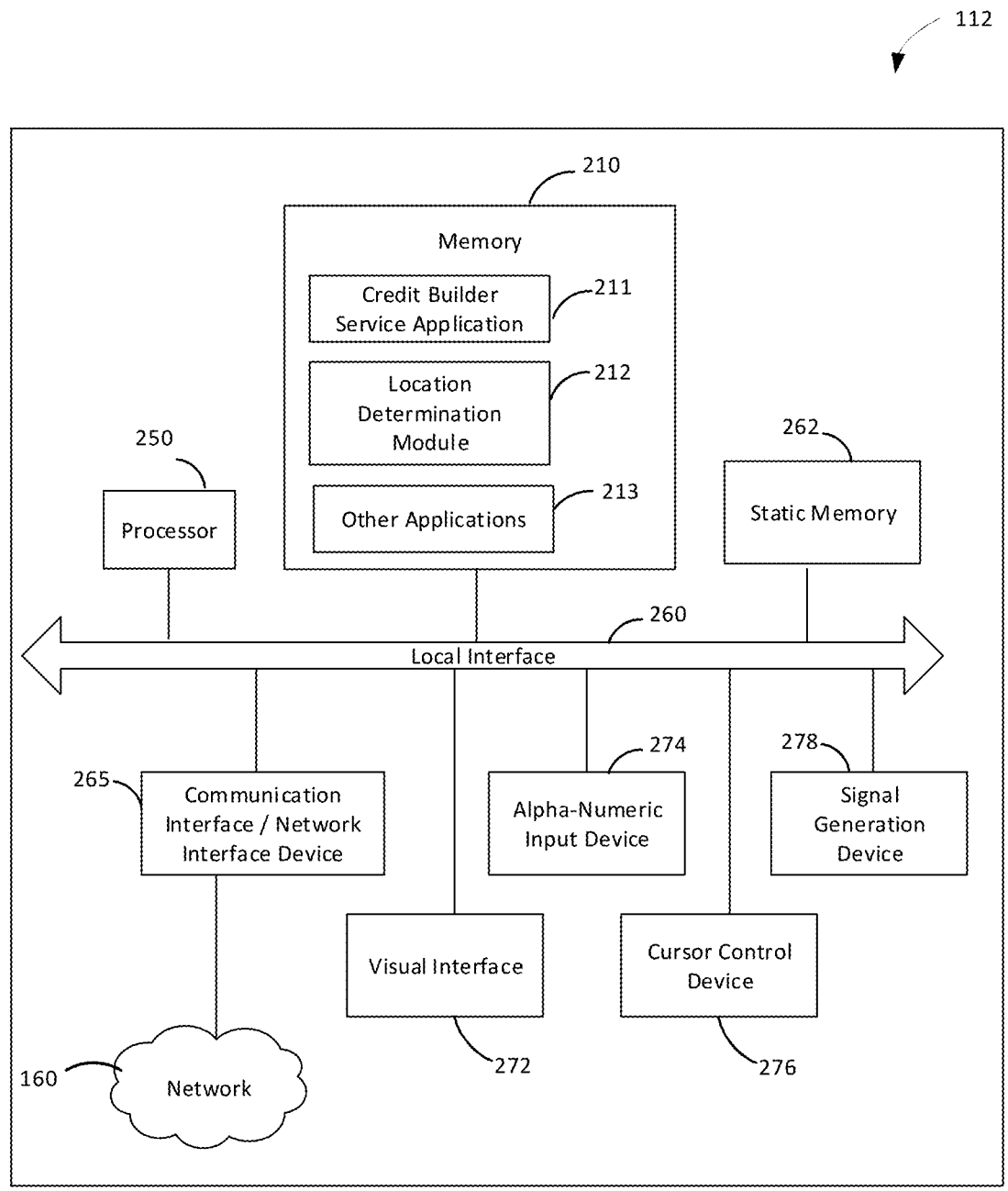
FIG. 2 is a block diagram illustrating component parts of a client device in accordance with some embodiments of the present disclosure.

FIG. 2 illustrates exemplary components of a client device 112, though the device is not limited thereto. The client device 112 may include a user interface through which a user may interface with credit builder system 150 via communications over network 160. The user interface may be displayed on device 112 through, for instance, one or more of a web browser, application, text message/alert, device-standard notification, or by any other technique that allows for the display of server-generated content on an electronic display or visual interface 272 of the device 112. The electronic display may be a screen, such as an LED screen, OLED screen, LCD screen, plasma screen, and/or touchscreen (e.g., capacitive or resistive touch display). The visual interface 272 may display user interfaces directly (e.g., on the screen) or indirectly on a surface, window, or the like (e.g., via a visual projection unit). The user interfaces may also allow for input of information via that screen and/or another input device (touch-sensitive components, keyboard, keypad, mouse, trackpad, text, voice call, passbook, wearable or peripheral devices, or any other known technique, whether implemented as software or hardware or any combination thereof. Device 112 may in some embodiments include alphanumeric input device 274 (e.g., a keyboard or touch screen keyboard), a cursor control device 276 (e.g., a mouse, a trackball, a joystick, a motion sensor, or other pointing instrument), a signal generation device 278 (e.g., a speaker), and/or a static memory 262, which components also are configured to communicate via local interface 260, which may include, for example, at least one bus.

Client device 112 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor 250. The illustrated embodiment depicts a number of modules stored in memory 210, specifically, credit builder service application 211, location determination module 212, and/or other applications 213. These depicted modules may variously represent one or more algorithms, computational models, decision making rules or instructions, or the like implemented as software code or computer-executable instructions (i.e., routines, programs, objects, components, data structures, etc.) that, when executed by one or more processors 260, program the processor(s) to perform the particular functions of their respective logic. These modules are depicted in FIG. 2 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof.

In an exemplary embodiment, credit builder service application 211 may be initialized or configured to allow user 110 to enter and complete an enrollment process with credit builder system 150 (and in some embodiments, with consumer banking service 180). In the enrollment process, the user 110 may be asked various personal questions that identify the user and may be used to locate information about the user on third party databases. The enrollment process may include obtaining authorizations from the user to access certain information about the user (e.g., credit score), and may obtain permission from the user to, on an ongoing basis, monitor some aspects of the user's activity. The user 110 may opt in or out of some or all aspects of the monitoring through the enrollment process. Information input by the user in the enrollment process via the user interface may be transmitted, through communication interface 265, to credit builder system 150, where it is stored and/or processed in a manner described in greater detail herein.

Following enrollment, the owner/operator of credit builder system 150 may in some embodiments provide to the user 110 a secured charge card (whether physical or digital/electronic). Credit builder service application 211 may then provide client device 112 with a user interface for activating the secured charge card, connecting it to the user's account with the consumer banking service 180. After the secured charge card is activated, credit builder service application 211 may transmit to the client device 112 one or more user interfaces to specify, maintain, and/or update settings that relate to the secured charge card. In some embodiments, this may take the form of a settings webpage, screen, or UI. For example, credit builder service application 211 may, via a settings UI, provide options for the users to enable or disable automatic deposits to their activated account (that is, money or other assets currently in an account of the user not with credit builder system 150 or consumer banking service 180, to credit builder system 150) to continue to increase the credit limit of the user or maintain the credit limit of the user. In various embodiments, options may also be provided for the user to make/disable automatic payments, activate new cards, view statements, and the like.

Figure 9A:
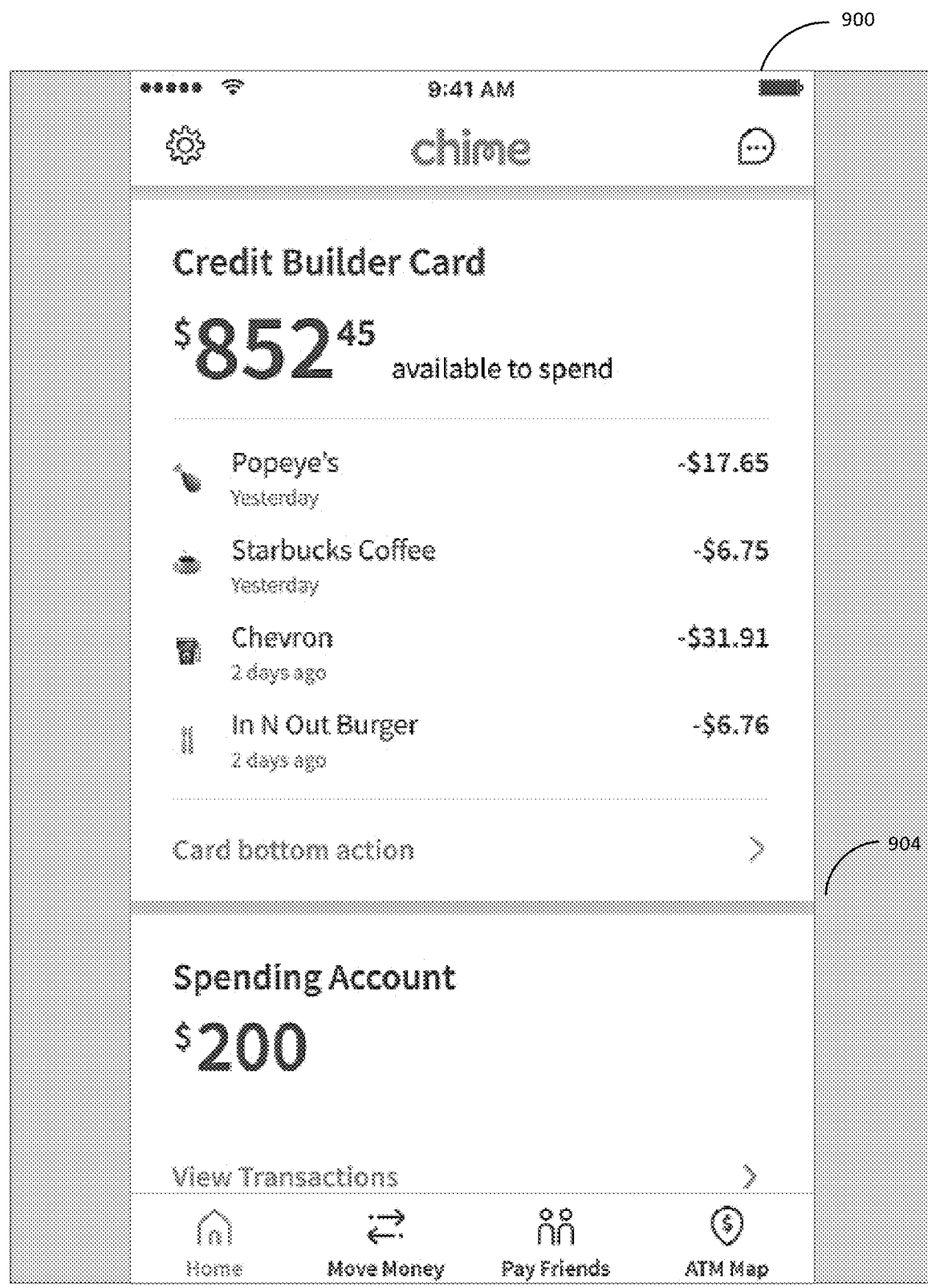
Figure 9B:
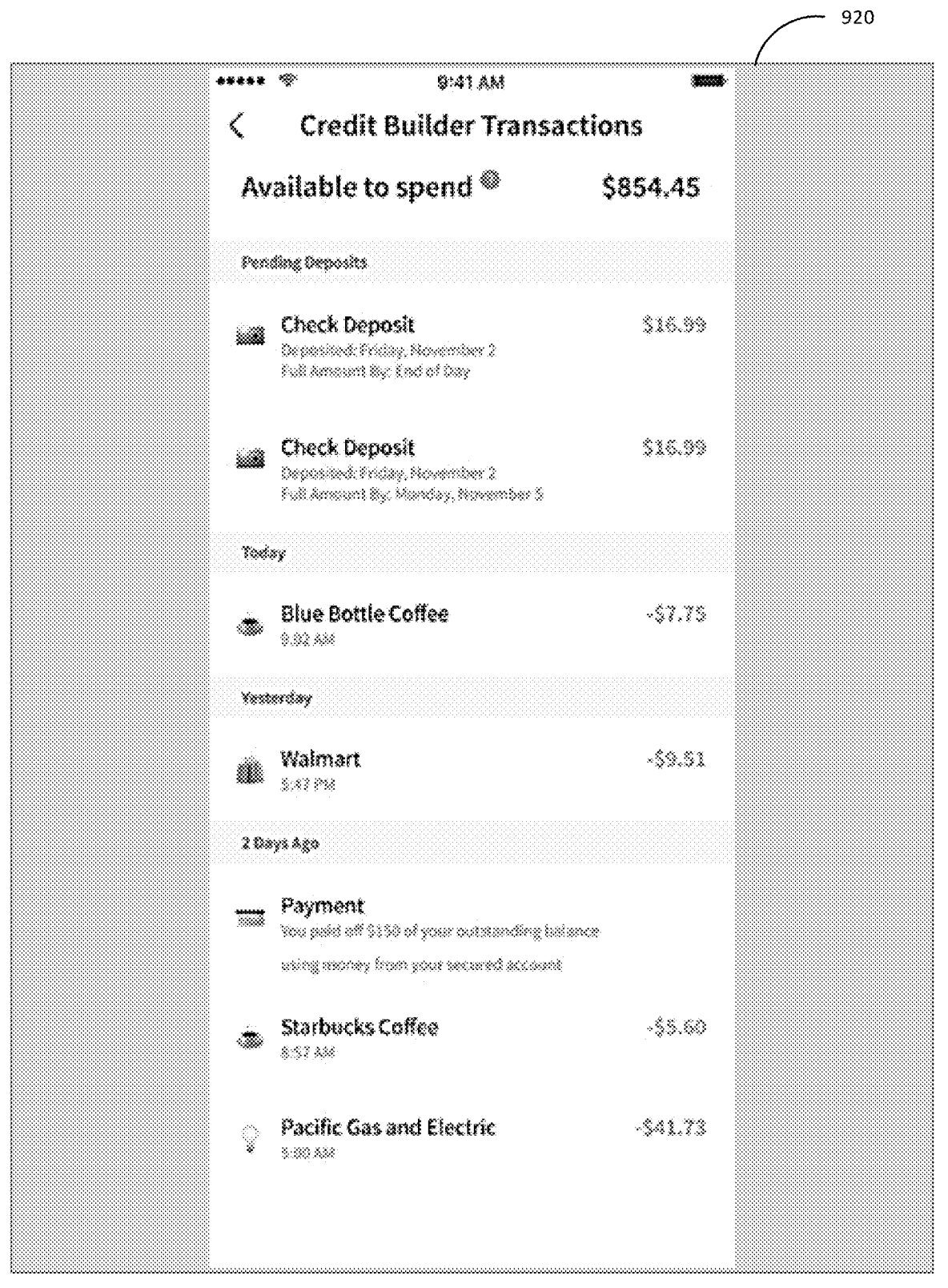
Figure 9C:
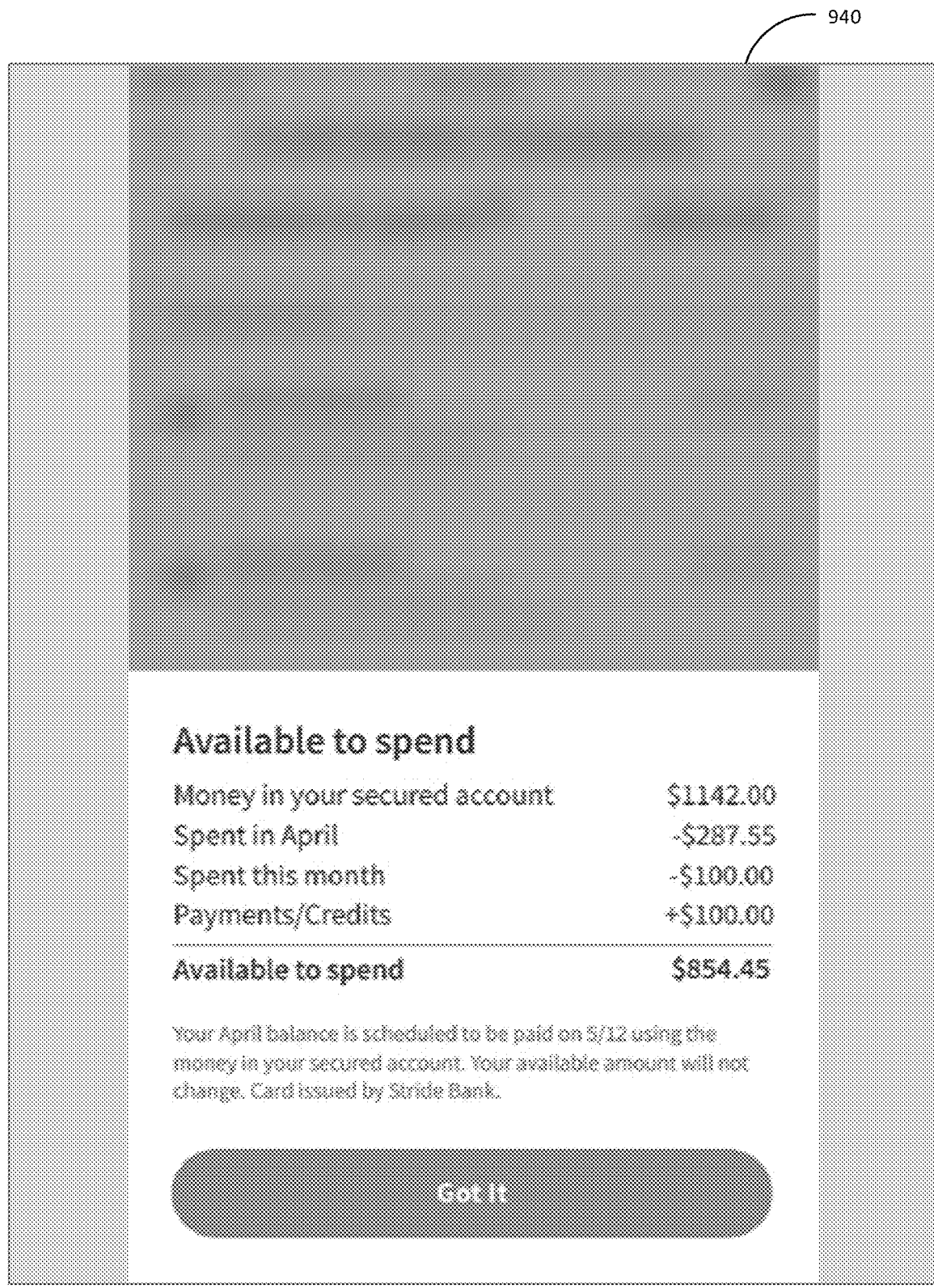
Figure 10A:
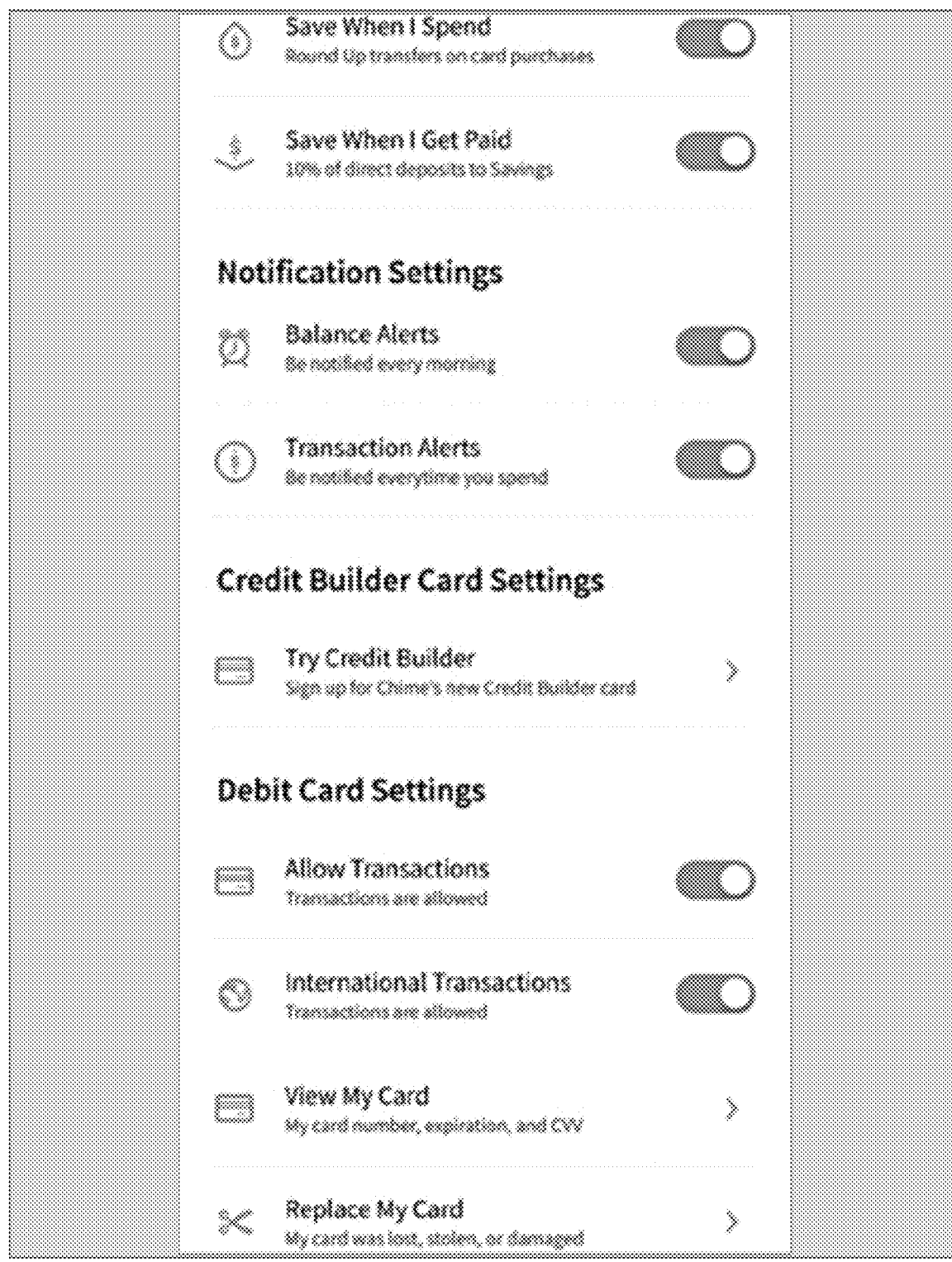
FIGS. 10A and 10B illustrate exemplary user interfaces for a user to input setting and/or personal preference information that are used in the generation and transmission of user activity recommendations, in accordance with some embodiments of the present disclosure.
Figure 10B:
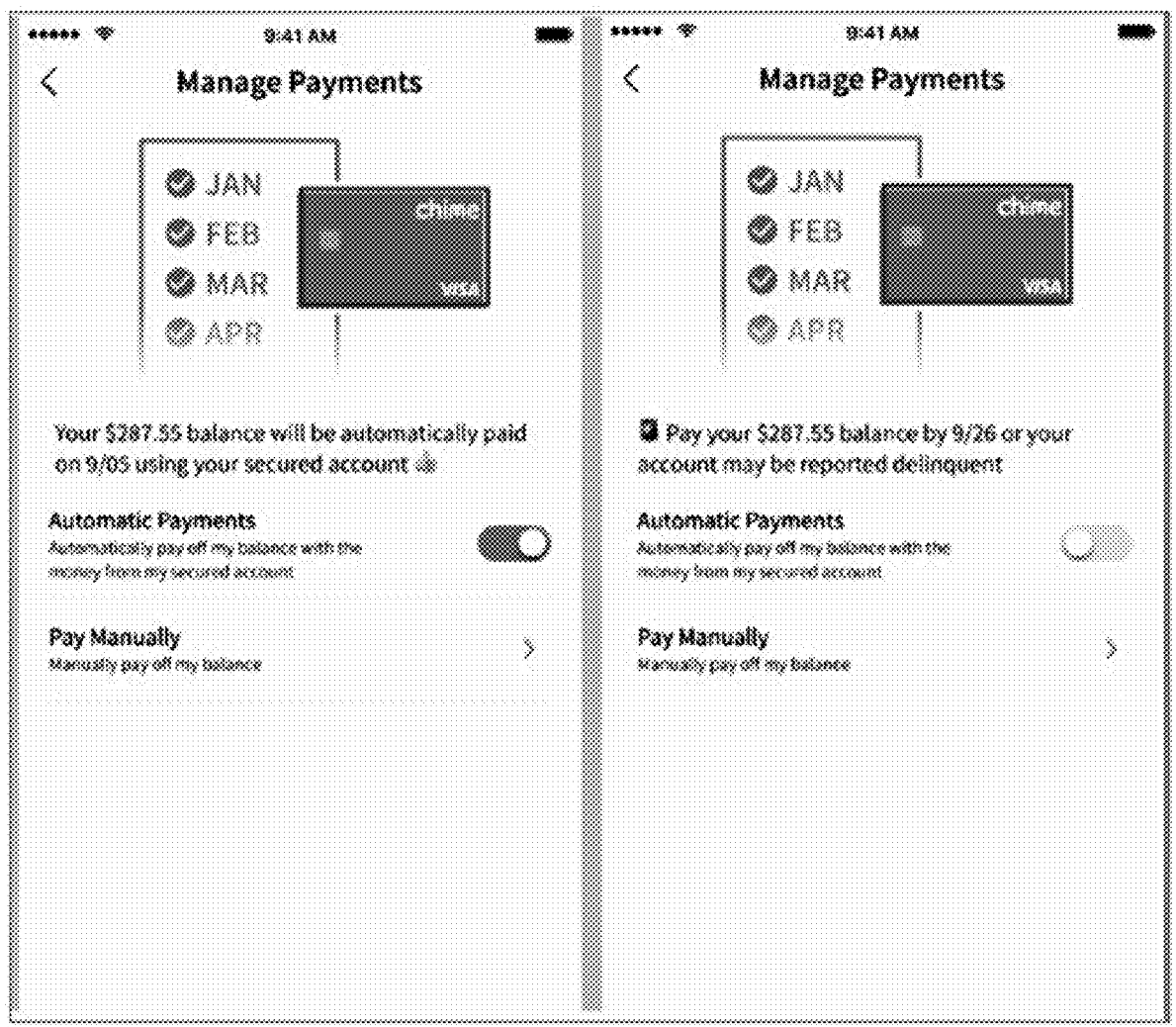
Figure 11:
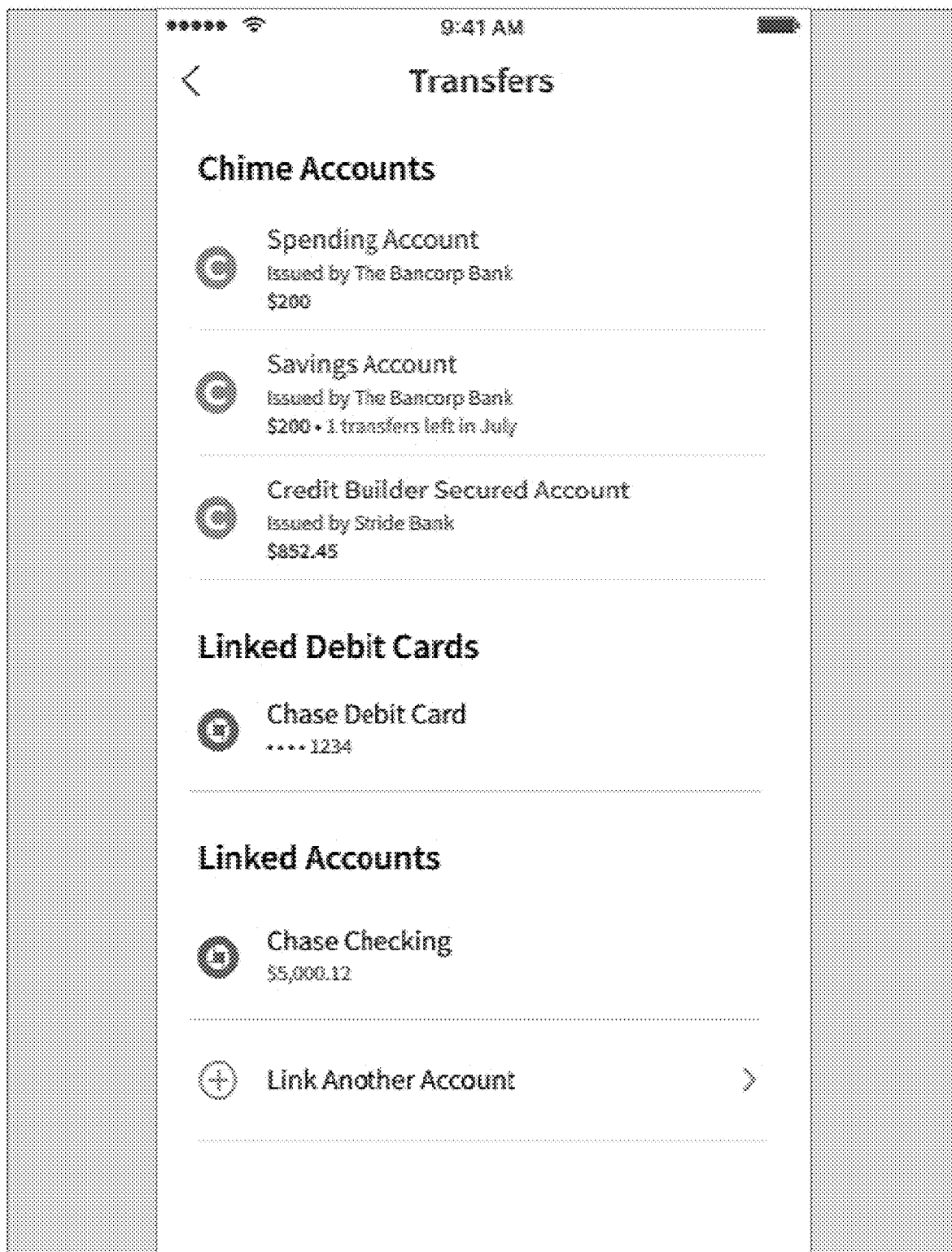
FIG. 11 illustrates an exemplary user interface for inputting a user's account information, where a user may have multiple accounts with one or more financial institutions, in accordance with some embodiments of the present disclosure.

Exemplary user interfaces provided by credit builder service application 211 to a client device 112 with a touchscreen are shown in FIGS. 9A-11. FIGS. 9A-9C illustrate exemplary user interfaces to facilitate the entry or viewing of user account information. FIG. 9A illustrates an exemplary user interface 900 with an initial, or "homescreen" page for a user who has a funded security deposit and transactions on their account. Tapping (or clicking or selecting) a transaction or 'View Transactions' (element 904) brings customers to a transaction screen, an exemplary embodiment of which is shown in FIG. 9B. Tapping an element on the transactions screen 920 corresponding to a transaction or purchase may bring up a screen showing the balance calculation, an exemplary embodiment of which is shown in FIG. 9C. From the user interface 940 illustrated in FIG. 9C, the user may tap/select 'Got it' to close and return to the transactions screen. FIGS. 10A and 10B illustrate exemplary user interfaces to facilitate the entry and/or editing of user settings. In FIG. 10A, a variety of settings options are presented to the user. FIG. 10A illustrates an example embodiment where the user has enrolled for a secured credit card, however in embodiments where the user has not yet enrolled, there may be a permanent entry point in the settings (e.g., a "default" page). Enrolling for a secured credit card allows a user to select user-specific settings associated with that card and/or their account. Once a user has enrolled, tapping Manage Payments from a settings page leads the exemplary user interface of FIG. 10B, which UI may change if automated payments are enabled or disabled. The user of the device 112 may disable automatic payments, pay manually, or tap the '<' at the corner of the interface to return to their settings page. FIG. 11 illustrates an exemplary user interface for an enrolled user to transfer funds. Multiple accounts belonging the user can be "linked" together, that is, associated in a memory of a system of the consumer banking service 180. For instance, in the embodiment of FIG. 11, funds can be transferred between the "Chime Accounts", while the settings do not permit transfer to or from linked accounts. Of course, all of these examples and their associated settings are merely illustrative, and any layout or information may be presented on the user interfaces (and may vary based on settings and/or circumstance), and different account management functions may be provided, in different embodiments.

Credit builder service application 211 may prompt the user 110 to input goals or milestones the user hopes to achieve. In an exemplary embodiment, the entered goal comprises a target credit score selected by the user. In some embodiments, the user may not specifically enter a numerical credit score, but may instead input a goal from which the credit builder system 150 may derive or interpret a target credit score. For instance, the user may enter information regarding a particular purchase, loan, or financing plan, which data can be used, in combination with other user data, to generate a target credit score or a delta value corresponding to a credit score increase. In some embodiments, rather than a credit score, the goal input by the user may be any appreciate financially-oriented goal, such as saving $50,000 (or another amount), paying off student loans, and the like. In addition to prompting the user 110 to input a goal, credit builder service application 211 may present a user interface on device 112 through which the user can input a timeline for achieving the goal, such as a target date or a period of time in weeks, months, or years by which they aim to reach the target goal (e.g., purchase a house by July of the year 2022).

Credit builder service application 211 may additionally prompt the user to enter additional information relating to income, spending, existing debt, liabilities (e.g., rent), and the like. The input values entered through the user interface by user 110 may be understood to be self-reported data, and some embodiments may require credit builder system 150 to additionally or alternatively obtain third-party data to verify, add to, or complete the self-reported data. The prompts presented to the user by credit builder service application 211 may be made during an enrollment process (enrollment UI(s)) for credit builder application 150, or during an activation process for a financial device 114. In some embodiments, the prompts may be presented to the user as part of a process where the user designates their preferences or preferred settings (setting UI(s), for example that of FIG. 10A) or any other screens such as those illustrated in exemplary FIGS. 9A-11. In some embodiments, the prompts may be presented to the user separately in connection with prompting the user to input goals.

Credit builder system 150 receives the input data from the user device, including the additional information and the goal, retrieves the user's credit score and/or other information (e.g., from third party databases 170), and determines therefrom a recommendation, as will be described herein in greater detail with reference to FIGS. 3-8. Credit builder service application 211 transmits the output of the recommendation process (that is, one or more human-readable recommendations) to the user 110 through the user interface displayed on device 112.

In some embodiments, credit builder service application 211, in furtherance of helping the user achieve their specified goal, may monitor user activity and progress in achieving their goal, and may, based on information received from credit builder system 150, provide further or updated recommendations to the user. As one example, credit builder system 150 may detect, based on input from the user captured by credit builder service application 211 or through monitoring activity and/or accounts of the user (having, in some embodiments, obtained authorization from the user to do so) that the user has encountered a circumstance that requires a modification to the recommendation. As just one example, the user may encounter an unexpected expense, such as a medical bill. The manner in which this is detected will be described in further detail herein with respect to FIGS. 3 and 4. Based on recommendation data received from the credit builder system 150, credit builder service application 211 may output a recommendation on whether to handle the circumstance by paying out-of-pocket, taking on debt, pulling the funds from a particular account or source (e.g., deferring student loan payments), etc. In an embodiment, credit builder service application 211 may access other applications 213 on client device 112 when determining the contents of such a recommendation. For example, if additional funds are needed above and beyond what credit builder system 150 knows will be earned by the user, and other applications 213 includes one or more apps that indicate a source of secondary income (e.g., an ability to drive for a ridesharing company, or to perform gig economy tasks on-demand, or other part-time employment), credit builder system 150 may determine, and credit builder service application 211 may transmit to the user a recommendation that such apps be used to generate additional income. In some embodiments, credit builder service application 211 may be configured to specifically handshake with the identified apps to discover and recommend specific tasks that would net the amount of secondary income needed to address the encountered circumstance.

Location determination module 212 may be a submodule of credit builder service application 211 or a standalone module of client device 112. Location determination module may be used by credit builder service application 211 to determine when the user 110 is in a location where funds are likely to be spent in a manner counter to the recommendation. In such an embodiment, client device 112 may additionally include a location-determination device, such as a device transmitting a beacon or signal, a GPS receiver, or another type of device that may be used by location determination module 212 to determine a current location of the customer device. Credit builder service application 211 may monitor the user's location using location determination module 212 and alert the user where spending actions associated with the user's present location will set the user back from their specified goal. This is described in further detail with respect to FIG. 6. Similar notifications may be made where a user is asked to authenticate an attempted transaction with the user's secured charge card along with a warning that the transaction, if authenticated, will set the user back from his or her goals.

Figure 3:
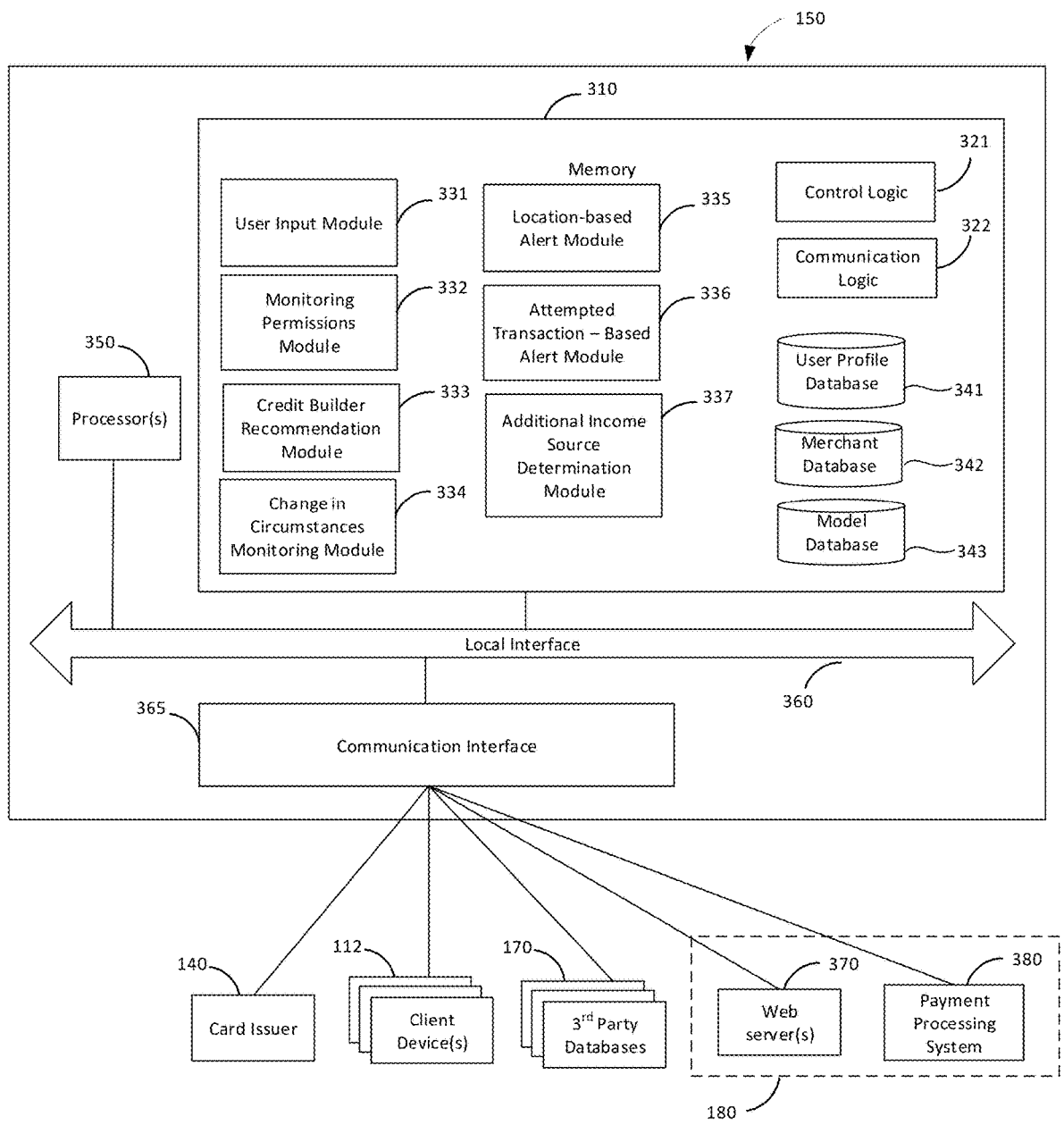
FIG. 3 is a block diagram illustrating component parts of a credit builder system in accordance with some embodiments of the present disclosure.

FIG. 3 depicts an example schematic diagram of certain components of a credit builder system 150. FIG. 3 shows a diagrammatic representation of a machine in the example form of a computer system within which program code (e.g., software/instructions) for causing the machine (via processor(s) 350) to perform any one or more of the methodologies discussed herein may be executed. The machine may operate as a standalone device or be connected (e.g., networked) to other machines. In a networked deployment, the machine may operate in the capacity of a server machine or a client machine in a server-client network environment, or as a peer machine in a peer-to-peer (or distributed) network environment. The machine illustrated in FIG. 3 may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The credit builder system 150 may include a memory 310. As used herein, memory 310 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 310 may also be understood as a machine-readable medium on which is stored instructions (e.g., software) embodying any one or more of the methodologies or functions described herein. While FIG. 3 illustrates a single discrete memory 310, it will be understood that the embodiments described herein are not limited to any particular arrangement and that other embodiments may store information in one combined memory, or with information stored in a different configuration in one or more memories, some local to the other components illustrated in FIG. 3 and/or some shared with, or geographically located near, other remote computing systems.

The illustrated embodiment depicts a number of modules stored in memory 310, specifically, user input module 331, monitoring permissions module 332, credit builder recommendation module 333, change in circumstance monitoring module 334, location-based alert module 335, attempted transaction-based alert module 336, and additional income source determination module 337, control logic 321, and communication logic 322. These depicted modules may variously represent one or more algorithms, computational models, decision making rules or instructions, or the like implemented as software code or computer-executable instructions (i.e., routines, programs, objects, components, data structures, etc.) that, when executed by one or more processors 350, program the processor(s) to perform the particular functions of their respective logic. These modules are depicted in FIG. 3 as several discrete components, each labelled as an individual "module" or "logic", however, in various embodiments, the functions of each respective logic may be executable on their own or as part of one or more other modules; that is, any configuration of the depicted logical components may be used, whether implemented by hardware, software, firmware, or any combination thereof. Further, the modules need not necessary be part of credit builder system 150 and may instead by distributed over one or more computing systems. The capabilities of these various logics are described in greater detail below.

The credit builder system 150 may include control logic 321, including one or more algorithms or models for generally controlling the operation of the credit builder system 150. The memory 310 may also, in one embodiment, include communication logic 322, including one or more algorithms or models for obtaining information from or communicating information via network 160 (FIG. 1). The credit builder system 150 may, via communication interface 365, operate to exchange data with various components and/or devices on the network 160 or any other network. For instance, communication interface 365 and communication logic 322 may be used (by, e.g., any of modules 331-337) to access data from or send data to any of card issuing system 140, one or more client devices 112, one or more external or third-party databases 170, one or more web servers 370, and/or one or more payment processing systems 380. In some embodiments, communication logic 322 may use APIs provided by these external entities to obtain their respectively stored data or transmit data to their systems, however, other methods of data collection/transmission may alternatively be used such as one or more software development kits, which may include, e.g., one or more application programming interfaces (APIs), web APIs, tools to communicate with embedded systems, or any other appropriate implementation.

In the embodiment of FIG. 3, one or both of web server 370 and payment processing system 380 may be owned or managed by a single entity, such as consumer banking service 180. In some embodiments, consumer banking service 180 may also own or manage credit builder system 150, such that generated recommendations for user actions made by system 150 may be sent to payment processing system 380 and funds in line with those decisions may be moved, deducted, and/or processed from an account at consumer banking service 180 associated with the user 110. Information or notifications regarding the transaction(s), processing, and/or the user's account(s) may be displayed to the user 110 via one or more user interfaces transmitted to client device 112 via web server 370. In an exemplary embodiment, web server 370 can deliver, to client device 112, a user interference that provides the consumer the ability to perform one or more banking-related functions, which may include any or all of: enrolling in one or more financial accounts, inputting account settings, management of financial accounts (e.g., checking/savings accounts), viewing of account statements or metrics, receiving financial alerts/notifications, making deposits/withdrawals, direct deposit, bill pay, money transfer, check deposit, and/or any other relevant activities. In some embodiments, the data transmitted to the client device 112 may be generated based on data stored in user profile database 341, however, in other embodiments, such data may be collected from one or more databases on system 150 or an external system.

While communication logic 322 is illustrated as being a separate logical component, in an alternative embodiment, the credit builder system 150 may include communication logic 322 as part of any of logics 331-337 or control logic 321. In another alternative embodiment, the communication logic 322 may communicate with third-party systems and/or may coordinate with the control logic 321 to read or write data to memory 310 or to another data repository (not shown) within the credit builder system 150.

The logics of the exemplary credit builder system 150 depicted in FIG. 3 may be executed by one or more processors 350, such as any of (or any combination of) central processing unit (CPU), graphics processing unit (GPU), digital signal processor (DSP), application specific integrated circuits (ASICs), radio-frequency integrated circuits (RFICs), other specialized processor or combination of processors, or other circuitry that communicates to and drives the other elements within the credit builder system 150 via a local interface 360, which can include at least one bus. While FIG. 3 illustrates one processor 350 which implements all of the various logics in the credit builder system 150, it is possible in other embodiments for the system 150 to employ multiple processors. In one such alternate embodiment, discrete processing elements may be used for each of (or any subset of) logics 331-337, control logic 321, and communication logic 322, or any portions or subsets of those logics. In some embodiments, the processing of system 150 is not limited to being performed by a processing element connected to the local interface 360, but instead, any portion of processing in support of the various logics may be distributed over one or more computer systems that may be remotely located. In some embodiments, credit builder system 150 may be implemented in whole or in part as a machine learning system (e.g., neural network software) for achieving the functionalities described herein. In one embodiment, one or more of modules 331-337 (or any subset of any of those logics) may be implemented at least in part as one or more machine learning algorithms.

Memory 310 may be configured, in some embodiments, to include various databases. While the term "database" or "repository" is used with reference to elements 341, 342, and 343, these components are not so limited nor is any particular form or configuration of data storage mandated, and the described "databases" may alternatively be an indexed table, a keyed mapping, or any other appropriate data structure.

Memory 310 may include a model database 343 that stores one or more machine learning models used by all or a subset of logics 331-337, as described in greater detail herein. Memory 310 may further be configured, in some embodiments, to include a user profile database 341 that stores account information related to one or more consumer accounts with a financial entity (e.g., a consumer banking service 180) that owns or manages system 150, or accounts with other financial entities linked to such consumer accounts. In some embodiments, user profile database 341 may include one or more tables, each entry corresponding to a unique set of account information. In some embodiments, user profile database 341 may include information about a user and/or a related account, such as a unique account ID, an associated consumer ID, a current account balance, and information regarding pending deposit/withdraw activity, if existent, user name, contact information (e.g., email address, mailing address, telephone number, etc.), date of birth, payment card information (e.g., payment card number, expiration date, cardholder name, security code) for each of any number of associated payment cards, customer account settings and/or preferences, and the like. User profile database 341 may, in some embodiments, store information detailing every transaction made or requested in connection with the user's account(s), including any of approved transactions, rejected transactions, withdrawn transactions, pending transactions, contested transactions, refunded transactions, and the like, along with account balances resulting from such transactions.

User profile database 341 may also include real-time and/or historic information relating to any of: consumer account creation/removal/edits, deposit/withdrawal activity (e.g., dates of activity, amount of deposit/withdrawal) on consumer accounts, activity by any users that may have shared or joint accounts with the consumer, consumer financial health metrics or scores, purchases made or pending using cards tied to any of the user's accounts, user activity on one or more user interfaces delivered by web server 370, and/or metrics generated on any of the above such information, whether based on an individual account or individual user, or in aggregate. In some embodiments, as various users login, make edits, changes, view, search, click, interact with, or otherwise engage in activities with the user interface on system 150, such activity may be stored in database 341 as indicators that may be considered, individually or in aggregate, in an analysis of user 110's activity. In some embodiments, this information may be understood as user engagement metrics or behavioral biometrics. In some embodiments, some of the data in user profile database 341 may collected from one more external (that is, third-party) databases or websites 170 (e.g., financial, government, media, commercial, or other sources, repositories, or websites, collected via communication logic 322) to determine whether and how a user has followed or communicated regarding the entity managing credit builder system 150 (which may be, e.g., a consumer bank), referrals that the consumer has made to other potential consumers, or similar considerations that may indicate a higher or lower level of user engagement and therefore, a greater interest in their own financial health.

Memory 310 may also store a merchant database 342 that stores information related to one or more merchants. In an exemplary embodiment, the information in merchant database 342 may contain information for all or a subset of the merchants associated with the transactions with any user account stored in user profile database 341. Other embodiments may exist where the data in merchant database 342 is collected from another source, such as a third-party aggregation system, one or more merchant banks, or from the merchants 120 themselves. In still another embodiment, merchant data may be collected from a user via device 112. In some embodiments, merchant database 342 may include information uniquely identifying each merchant, such as a merchant ID, merchant name, contact information (e.g., email address, mailing address, telephone number), merchant bank information, and the like. In some embodiments, merchant database 342 may include information categorizing/classifying the merchant, or the merchant's product(s) or inventories, into one or more purchase categories. In some embodiments, credit builder system 150 may assign and store positive or negative weights to different categories of merchants or goods, reflecting the relative impact that purchases from those merchants or goods may have on a user's credit score/financial goals.

In an exemplary embodiment, system 150 may update information in databases 341 and/or 342 based on data collected from web server 370. In the embodiment of FIG. 3, web server 370 is remote from system 150 and therefore such information is collected via communication logic 322. In other embodiments, web server 370 may be local to, or integral with, system 150 and such data may be accessed over local interface 360. Web server 370 may transmit information to and receive data from user device 112.

In an alternate embodiment, databases 341, 342, and 343 are not stored in credit builder system 150 itself, but are remotely stored in a shared memory (not specifically shown) so as to be accessible via one or more communication networks, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the databases 341, 342, and 343 may be accessible over the Internet and payment and information may be communicated between system components in an encrypted format such by a transport layer security (TLS) or secure socket layer (SSL) protocol. In such an embodiment, both credit builder system 150 and payment processing system 380 are owned or managed by consumer banking service 180, and both systems 150 and 380 may access shared data. By these means, as either of systems 150 or 380 updates data in databases 341, 342, and 343, the updated information is available to the other system.

The data stored in user profile database 341 and external databases 170 is used by logics 331-337 to provide a recommendation for user activity that may work to meet or approach the user specified goals entered by the user 110, the goals have been received by credit builder service application 211 and transmitted to credit builder system 150.

Figure 4:
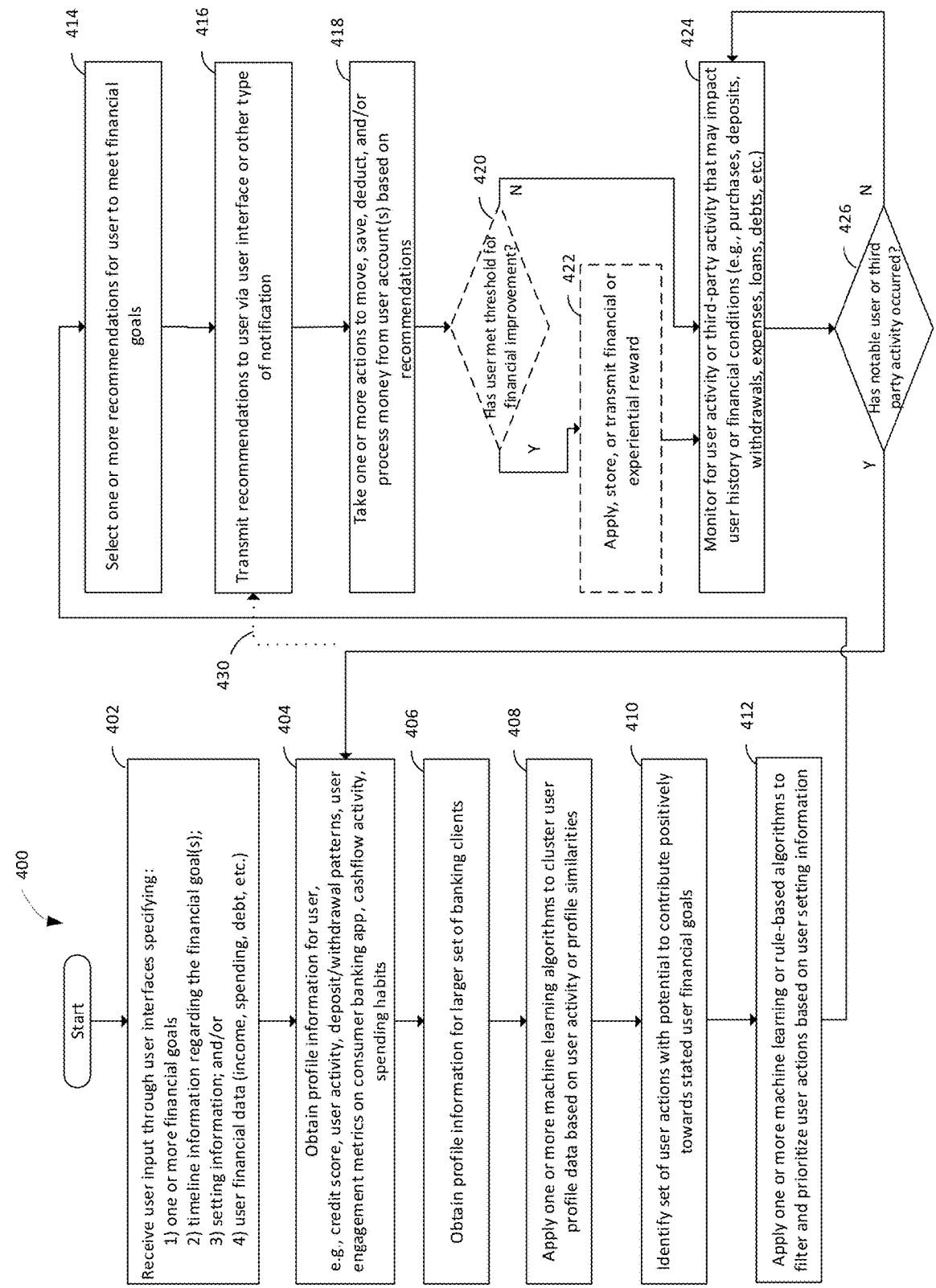
FIG. 4 is a flow chart of an exemplary user activity recommendation process in accordance with some embodiments of the present disclosure.

FIG. 4 illustrates an exemplary process 400 by which credit builder system 150 may provide activity recommendations to users based on feedback from machine learning models. In step 402, user input module 331 receives a transmission from credit builder service application 211. This transmission contains data collected from user 110 via a user interface displayed on client device 112, the data including various user input related to the user's financial condition. Among the data is transmitted is a user-input financial goal. In some embodiments, the user-input data may also contain information regarding account enrollment, income, spending, debt, opt-in and opt-out settings to various forms of user monitoring, and the like. User input module 331 is configured to store, in user profile database 341, a profile associating the input information with one or more identifiers sufficient to uniquely identify a user, for example a user ID or client device ID based on access credentials used to set up credit builder service application 211 during an enrollment process.

Figure 5:
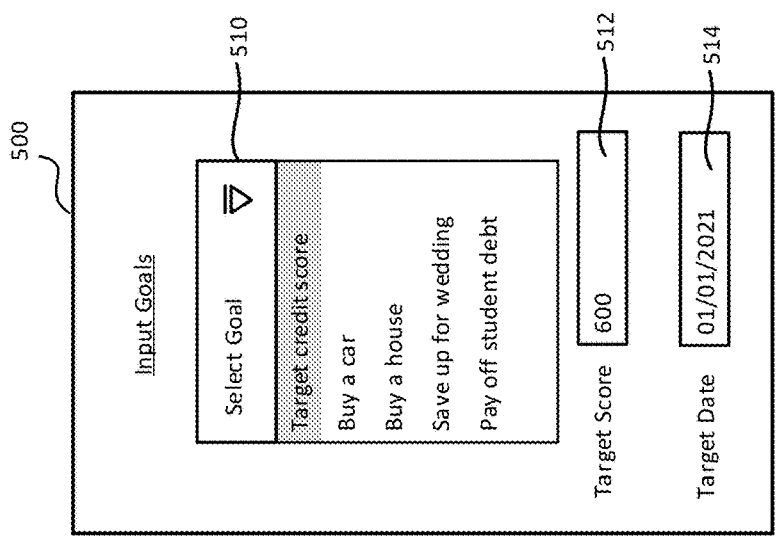
FIG. 5 illustrates an exemplary user interface for a user to input goals, from which user activity recommendations may be derived, in accordance with some embodiments of the present disclosure.

FIG. 5 illustrates an exemplary user interface 500 displayed by credit builder service application 211 on the client device 112 that may be used to facilitate a user's input of their financial goals. User interface 500 includes goal selection element 510, a user interface element capable of taking in a numerical value corresponding to a user's credit score or other value or input reflective of the user's financial health. While element 510 is depicted as a drop-down menu, other embodiments may implement element 510 as a text field, a slider element, a dial (allowing users to slide the score up or down), or the like. In FIG. 5, the selected goal in element 510 is a target credit score, and in response to this selection, fields 512 and 514 (here, text input boxes, though other embodiments may vary) are displayed to the user to input particular numerical and date values. In some embodiments, rather than a credit score itself, the user may instead input a credit score improvement value, where for instance, a user input value of 50 would correspond to a goal of increasing their credit score by 50 points. In some embodiments, rather than a target date or deadline 514, the user may input a target timeframe (e.g., a value in days, weeks, months, years, etc.) in which they wish to accomplish their stated goal.

In the embodiment of FIG. 5, element 510 contains options to select prospective goals other than a credit score value, that is, to buy a car, buy a house, save up for a wedding, or pay off student debt. These values are of course exemplary, and any appropriate goals may be used. In some embodiments, if such non-numerical values are selected in element 510, one or more user input fields may be displayed to the user (not specifically shown) requesting the entry of additional information such as cost, financing information, interest, or the like. User interface 500 may take any form such as touchscreen interface, a web browser, email, text/SMS, voice prompted, or any appropriate interface so long as user input can be taken in. The specified goal (or goals, if more than one is entered), may be populated in the user's profile in user profile database 341. In some embodiments, credit builder system 150 may perform one or more calculations on the data input in elements 510, 512, and/or 514 to generate a target credit score for the user even if the user did not themselves enter a credit score. For instance, if the user indicates their goal is to purchase a house, credit builder system 150 may determine, based on input information and/or third party information, that a credit score of 580 (or any appropriate value) is desirable to obtain the necessary loans. Accordingly, the credit builder system 150 may store in user profile database 341 a target credit score of 580, even where the user was not themselves aware of a target credit score.

In response to the user's input goal and other information, in steps 404-414, credit builder recommendation module 333 generates recommendations for the user (actions to be taken by a user to reach their stated financial goal, based on the user's profile and other data retrieved from third party databases 170, such as the user's current credit score. Credit builder recommendation module 333 may additionally or alternatively make recommendations with respect to a credit limit that would be beneficial for achieving a goal. Credit builder recommendation module 333 then transmits a recommendation to credit builder application 211 for output through a user interface of client device 112. To accomplish this, credit builder recommendation module 333 may rely on information collected by other components of system 150.

Credit builder recommendation module 333 derives and selects its recommendations using one or more machine learning models stored in model database 343. At a high level, these machine learning models may be categorized as a clustering model and a selection model, though any number or type of models or algorithms may be applied in different embodiments. The clustering model is configured to group or cluster sets of users (various banking clients) based on similarities in their user histories, so that patterns in their respective user activities that lead to positive or negative credit progress can be seen. The selection model is a user-specific algorithm, taking a set of all potential user activities that may positively impact a user's credit and determining, based on user preferences and other relevant user profile data, which of those activities should be selected and consolidated into recommendations (and the order of such recommendations, where appropriate).

The models in model database 343 are trained using sets of training data from which information representative of improving a credit score (or reaching another goal) within particular timelines can be derived, typically based on historical data regarding the user's profile and activities and/or the profiles and activities of other client. Various machine learning models used by credit builder system 150 may rely upon different training datasets (e.g., different sets of users, data from different dates, account types, etc.). The data available to build these datasets is collected from any of, or any combination of, user profile database 341, merchant database 342, and/or third party databases 170. The collection of training data may include, for instance, demographic data, payment data, and/or app behavior data. The demographic data may include information such as a user profile, age, income (self-disclosed), job type, geographic location, and the like. The payment data may include, among other things, data on spending behavior including purchases that a user has made, types of merchant categories (grocery stores, restaurants, subscriptions, luxury goods, rent, etc.), income from direct deposit, sources of income, etc. Some of this information may be self-reported by the user 110 (e.g., during enrollment or collected through survey), some may be drawn from payment processing system 380, such as card transaction data (from issuer server(s) 140), or money movement data between accounts, data from ACH systems, account balance data and/or patterns therein, and so on. Some of this information may be collected from one or more third-party databases 170, such as 1099 data, full-time employment or unemployment data, government benefits data, credit reports (historical and new), lines of credit, payment history, and the like. App behavior data may be collected from web server 370, and includes information about the user's interactions with the app (frequency and timing of user engagement, types of activity), etc.

As this information is constantly being updated through user and third party action, the training sets are non-static between iterations of training, changing based on a new quantity of available historical data. The step of training the models on the various training datasets need not occur at any particular point in process 400, though an initial training should be complete before application of the clustering model in step 408. The machine learning models may be trained at any appropriate time or interval, for instance, daily or hourly, or otherwise periodically or at a scheduled time, or the training may be triggered by the occurrence of a particular event, such as a particular type of user activity, upon the creation of a number of new accounts with the consumer banking service 180, or any appropriate circumstance. In some embodiments, the models are trained in real-time or near real-time, for example at the time new user activity information is received, or at the time of (or immediately before) execution of step 408. The frequency and/or triggers for training the models against the training datasets may in most circumstances be determined or limited by the computing resources of the credit builder system 150. In an exemplary embodiment, the training of the machine learning models may be performed in the cloud, while the application of the models may be performed in a local or secured environment (in case of limitations on network connectivity) or in the cloud, however, any practical implementation may be used in different embodiments.

In step 404, credit builder recommendation model 333 obtain current and/or historical profile information for the particular user 110 it is generating recommendation for. This profile information includes, e.g., current and target credit score, user activity, deposit/withdrawal patterns, user engagement metrics on consumer banking app, cash flow activity, spending habits, user preferences or settings, etc. In step 406, credit builder recommendation model 333 may obtain similar profile information for a larger set of banking clients. The particular set of clients may in some instances include all clients of consumer banking service 180 (and/or partners or linked banks or accounts), and in other instances may be a subset thereof, selected by any appropriate means.

In step 408, credit builder recommendation model 333 applies the trained clustering model from model database 343 to group together users with similar data points (e.g., income, credit score, goals) to discover underlying patterns in user activity. By identifying the changes or actions of other clients who have been successful at improving their credit score, credit builder recommendation module 333 may infer proposed similar behavior or actions that the user 110 could follow to potentially effect similar credit building results. Further, recommendations may be applied by segmenting clients into groups. A user 110 might be similar to a group that has better credit on several dimensions, but dissimilar on others. By identifying the characteristics of the group, credit builder recommendation module 333 can recommended that the user improve on attributes that may not be related to credit score.

In an exemplary embodiment, the clustering model applied by credit builder recommendation module 333 is or includes a K-means clustering algorithm, which looks for a fixed number (K) of clusters in a dataset, a cluster being a collection of data points in the dataset that are aggregated together because of identified similarities. As just one example, clusters may be variously created based on factors such as whether there has been recent activity on the account, the amount of historic data on account activity (long lived vs. new accounts), similarity in demographics, account type, creation date or account age, or any other recognized criteria. Based on the perceived relevance and impact of the shared features, various actions taken by users within a cluster may be weighted or ranked in their perceived significance towards the desired goal of user 110. In other embodiments, the clustering model may use other algorithms as an alternative to (or in addition to) K-means, for instance, Mean-Shift Clustering, Density-Based Spatial Clustering of Applications with Noise (DBSCAN), Gaussian Mixture Models (GMMs), bottom-up hierarchical clustering, or any other appropriate mechanism(s). Regardless of the algorithm applied, the clustering model functions to find similarities between users within a cluster and to identify, based on those similarities, a set of user actions that may potentially contribute positively towards the user's financial goal.

The output of the clustering model is used, in step 410, to identify a set of user actions that may potentially contribute positively towards the user's financial goal; in the exemplary embodiment, actions that would function to raise the user's credit score. However, not all of these user actions may be practicable or preferable to the user. Accordingly, credit builder recommendation model 333 applies a selection model from model database 343 (step 412) to filter and prioritize the user actions based on the user's goals, stated or default preferences, and/or setting information. The selection model is a user-specific algorithm, taking a set of all potential user activities that may positively impact a user's credit and determining, based on user preferences and other relevant user profile data, determining which of those activities should be selected and consolidated into recommendations (and the order of transmittal or presentation of such recommendations, where appropriate).

In some embodiments, while the user may have input a stated goal (e.g., raising credit score, saving a certain amount of money), the user may have indicated preferences, or preferences may be assumed, that would necessitate the prioritization of different actions. For example, credit builder recommendation model 333 may contain logic sufficient to determine, based on account withdrawal activity, that the user 110 has an anticipated large expense (e.g., routine expense such as rent) in the near future, and as a result, may not prioritize or select potential user actions that would reduce the amount of funds available to the user for that expense. In another example, the user 110 may have included, via a settings interface presented by credit builder service application 211, a rule or setting as to how money in the user's accounts should be managed (e.g., 10% of deposited income moved to savings account). In such a situation, credit builder recommendation model 333 may contain logic to defer to the user's specified settings and to exclude or filter out potential recommendations that conflict with such settings. In other embodiments, the credit builder recommendation model 333 may filter out user activities that are inappropriate, inadvisable, or inefficient for the user based on, e.g., demographic data (such as age, income, career type, etc.), available funds, habits, or other recognized features of the user 110. The selection model may also contain logic sufficient to understand, based on the user's financial history and or engagement with the credit builder system 150 via their client device, whether the user is more or less likely to implement a large number of solutions. For instance, a user that is less engaged in their financial health, has limited or low balances or flexibility of money movement, unpredictable spending needs, etc., may be less able or willing to implement many structured financial recommendations. In a case that the user is less likely to implement multiple actions, the selection model may similarly limit its selected user activities. In some embodiments, rather than a machine learning model, the selection model may include a rules-based or deterministic system, wherein each of the user's preferences is applied as a rule to filter out or select certain activities.

The output of the selection model is a set of one or more recommendations that have been selected for (and targeted to) the user (step 414). A recommendation may be, for instance, a human-parseable message (such as a character string, video, or audio recording) that instructs a user on a particular action they may take for their financial health. As just a few examples, the recommendation may include, for instance, a timeline for increasing the credit limit, whether to open additional credit vehicles (e.g., an automobile loan), whether to close the secured charge card offered by credit builder server 330, whether to limit spending to a certain dollar amount, a timeline for repaying existing debts, whether secondary income should be pursued, recommendations on payment behavior (whether to have a high balance or zero balance on a payment device 114), paying down credit card, creating self-lender loans, adding a utility bill, disputing items or charges, or any other appropriate recommendation(s). In some embodiments, memory 310 may include a database storing a comprehensive set of possible recommendations (e.g., as character strings), and the selection model may refer to such database to select recommendations based on the user actions identified by the clustering model in step 410.

In some embodiments, in step 418, credit builder system 150 may take a positive action in addition to or as an alternative to the recommendation notifications transmitted to the user in step 416. Additional modules, though not depicted, may be executed by credit builder server 330 to take actions to improve the credit score (or otherwise meet the financial goals) of the user. For instance, credit builder system may, in cooperation with payment processing system 380, transmit an electronic instruction to a system remote from credit builder 150, instructing the remote to system to act to fund an account (e.g., to meet a deadline for payment), make an ACH payment, dispute a charge, automatically deny vendors from charging for recurring services, or take other appropriate actions. As one example, a cable provider charge may be denied where credit builder server 330 determines that the cable provider charge would be counter to the user's goal, and where nonpayment would be less detrimental to the user's credit score than payment would be (e.g., because the funds could be used to improve the user's credit limit or pay back more urgent loans). In an exemplary embodiment, such activities would not require a specific user authorization; that is, they may be conducted in an automated fashion (in some instances using known authentication information provided by the user to the system 150). In some embodiments, the user 110 may, via a settings interface presented by credit builder service application 211, opt-in or opt-out of all or certain types of automated actions.

In some embodiments, the data against which the clustering model is applied in step 410 may include third-party application data collected from the client device 112 that evidences an opportunity for an additional source of income. Additional income source determination module 337 determines sources of additional income that are available to a given user. For example, credit builder recommendation module 333 may determine that additional income is needed to achieve a goal, the source of which income may be determined using additional income source determination module 337. In an embodiment, additional income source determination module 337 queries client device 112 or the user's profile in user profile database 341 (if such information in stored therein) to determine other applications 212 installed to client device 112, typically third-party applications. Additional income source determination module 337 may determine whether one or more of the other applications 213 are applications known (e.g., based on database entries) to be income-generating applications. In some embodiments, additional income source determination module 337 may determine that an application is an income-generating application if the application is identified by the clustering model to be commonly installed on devices of banking clients that have multiple streams of income. Examples of income-generating applications are "gig" economy applications (e.g., ridesharing or delivery applications where use of the application can be made to accept payment for providing a driving service, or task applications where use of the application can be made to accept payment for performing a task), quid-pro-quo applications (e.g., where taking a survey is rewarded with monetary payment), and the like. In some embodiments, additional income source determination module 337 may not identify any applications for use in obtaining additional income. Additional income source determination module 337 may determine whether the user is eligible for using such applications by accessing third-party data from various third party databases 170. For example, additional income source determination module 337 may query a driving records database to determine whether the user has a clean driving record; responsive to finding a clean driving record, additional income source determination module 337 may recommend that the user download a ridesharing application and use his or her spare time to earn extra income by using the application to drive passengers.

In some embodiments, where the credit builder system 150 identifies the additional source of income after the credit builder recommendation module 333 has transmitted recommendations to the user (e.g., as a change in circumstances described herein with regard to step 424), the credit builder recommendation module 333 may transmit a push notification or message, separate or subsequent to the recommendations transmitted in step 414, to recommend to the user to earn additional income through that identified application without going through a subsequent machine learning analysis, for example as indicated by the branching line 430 (dotted line) in FIG. 4. In response to identifying an application of other applications 213 (or otherwise identifying an option for additional income), additional income source determination module 337 may transmit indicia of the identified application to credit builder recommendation module 333, which stores that data in the user profile database 341 in association with the unique identifier for the user. For example, where a goal or circumstance requires an extra $200 to be earned before a certain date, credit builder recommendation module 333 may identify, as a potential user action, that the identified application can be used to make the extra income. Further, some applications provide additional income during peak hours (e.g., surge pricing during rush hour for ridesharing applications). Credit builder recommendation module 333 may provide a recommendation, e.g., using a push notification at client device 112, when additional income and/or peak hours are available, to further incentivize the user to obtain the additional income. These notifications could be sent via any other appropriate type of notification, such as e.g., an app-based notification or message, an SMS or text message, an email, a phone call, a sound or visually-based alert or ping, or the like.

In step 424, the system may monitor for user activity or third-party activity that may impact user financial history of conditions, such as change in income or credit, purchases made or planned, deposits, withdrawals, known or regular expenses (rent, student loans, etc.), loans, debts, and the like. Change in circumstance monitoring module 334 monitors circumstances that may affect the user's ability to reach his or her stated goal. In an exemplary embodiment, this monitoring is performed through a periodic (e.g., daily) analysis of the information associated with the user 110's profile in database 341, and/or data from third party systems 170 such as credit reports. The term change in circumstances, as referred to herein, may refer to a deviation from a prediction made by credit builder recommendation model 333 that was used as a premise of a recommendation.

Based on the monitoring in step 424, the system 150 may determine that a relevant or notable user activity has occurred, or a third party activity has occurred that would impact the credit score or perceived creditworthiness of user 110 (step 426). When change in circumstance monitoring module 334 detects a change in circumstance, change in circumstance monitoring module 334 transmits a notification to credit builder recommendation module 333. In an exemplary embodiment, the process cycles back to step 404 (from a Y decision in step 426), in which credit builder recommendation module 333 collects the stored historical profile information (which has been updated with the change in user activity data), conducts a machine learning analysis to determine updated recommendations for the user, and responsively generates an updated recommendation. Small changes to a user's circumstances (such as changes to income or credit) may impact the center points of clustered data similar to the user 110, and therefore, both the clustering model and the selection model are rerun in the exemplary embodiment. Even if the user takes minimal action, for example, logging in to system 150, the clustering may change, as the user has built some additional degree of credit history. In such an embodiment, it is not guaranteed that the new or updated recommendations that address the change in circumstances will be selected for transmission to the user, for example where a new recommendation does not meet user-specified preferences.

To illustrate, in an embodiment where the change in circumstance is determined to be favorable (e.g., a gift that enables a user to maintain a higher credit limit with his or her charge card, which in turn would result in achieving a higher credit score faster), credit builder recommendation module 333 may recommend an action (e.g., deposit more money to achieve higher credit limit), or may automatically act in accordance with its recommendation (e.g., automatically transfer funds from a user's bank to credit builder system 150) to maximize the user's ability to reach his or her goal. In an embodiment where the change in circumstance is determined to be unfavorable (e.g., an unexpected bill is detected, where it is determined that the user will be unable to meet all obligations and maintain a trajectory toward his or her goal), credit builder recommendation module 333 may recommend that the user 111 obtain additional income and/or may generate actionable recommendations for doing so (e.g., as discussed below with respect to additional income source determination module 337). As one example, credit builder recommendation module 333 may have predicted income of between $500 and $1,000 per week from a particular job, and change in circumstance monitoring module may have detected, through monitoring of a user's checking account (e.g., as permitted based on permissions accessed by monitoring permissions module 332), that the income received in a given week was either below $500 or above $1000. Other examples of changes of circumstances may be detection of receipt of a gift, an unexpected expense, such as a medical expense, detection of a change in interest rates, and the like.

Monitoring permissions module 332 tracks, for each user of credit builder system 150, whether available forms of monitoring should or should not be performed. Monitoring permissions module 332 may perform this determination by retrieving, from user profile database 341, information as to whether a user has opted in or out of a given monitoring capability of credit builder system 150, e.g., via a settings interface. Monitoring permissions module 332 may instruct client device 112 to have its credit builder service application 211 activate all or a subset of the monitoring permitted for the user of client device 112 (e.g., location monitoring, spending monitoring, etc.).

In one embodiment, the user activity recognized in step 424 may be an attempted purchase transaction at a merchant, and the credit builder system 150 may deviate from (or add to) process 400 to provide notification to the user in real-time to avoid negative impact towards the user's financial goals. Attempted transaction-based alert module 336 determines when the user 110 is attempting to make a transaction with payment device 114, and determines based on information about the transaction whether to alert the user. For example, when the user uses his or her secured charge card issued by credit builder server 330 to perform a transaction, attempted transaction-based alert module receives information about the transaction, such as the location where the transaction occurred, the cost of the transaction, potentially information about the item being purchased, and/or other information. Attempted transaction-based alert module 336 may compare the received information to entries of a database to determine whether to alert the user before authorizing the transaction.

Similar to the process executed with regard to location-based alert module 335, attempted transaction-based alert module 336 may transmit alerts to client device 112 based on information of the user's profile. As one example, alerts for a luxury location may be performed based on information in the user's profile, and the luxury location's tier. Location-based alert module 335 alerts a user where a user's location (e.g., as determined using location determination module 213 of client device 112 of the user) is determined to be correlated with behavior that is detrimental to the user's stated goal. For example, merchant database 342 may include a database including coordinates of locations that generally provide luxuries and do not generally provide necessities (referred to herein as luxury locations). Necessities may be expenditures considered basic items or services necessary for day to day living, for example, housing and food expenses. Luxuries are those expenditures that would not be necessities. The database listings may include tiers corresponding to the expense incurred by a luxury. For example, a low tier luxury store may be a coffee shop, whereas a higher tier luxury location may be an expensive bar or restaurant. Location-based alert module 335 may generate an alert when the coordinates of the device 112 (e.g., as determined from location determination module 213) match those of a luxury location. In an embodiment, credit builder recommendation module 333 may determine that a user 110 can reach their goals with some luxuries, but not others, and may include an entry in the user's profile in user profile database 341 indicating that an alert should be triggered for luxury locations of a certain tier, but should not be triggered for luxury locations below that certain tier.

The alert may be a notification (e.g., a push notification or other notification received at client device 112) that requires confirmation from the user before the purchase is authorized, or any other appropriate type of notifications, such as e.g., an app-based notification, an SMS or text message, an email, a phone call, a sound or visually-based alert or ping, or the like. The alert may include details of the impact of the transaction on the user's ability to reach his or her goals, may include a hyperlink or instructions on how to obtain such details, or may contain content as set by a user's notification settings or other default settings. A user's decision to move forward with the transaction despite a recommendation not to do so may be recognized by attempted transaction-based alert module 336 and transmitted to change in circumstance monitoring module 334. Change in circumstance monitoring module 334 may in turn trigger a new recommendation from credit builder recommendation module 333, wherein the process cycles back to step 404, the user's profile information having been updated with the purchase decision and/or user activity in response to the notification.

Figure 6:
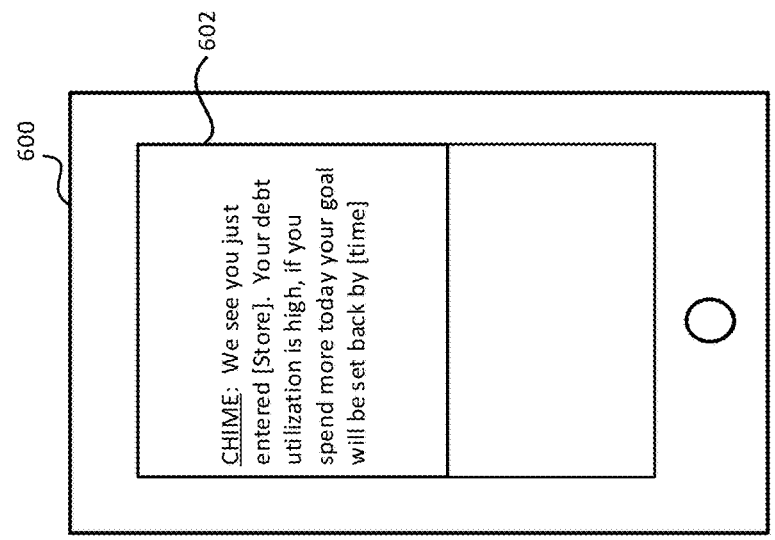
FIG. 6 illustrates an exemplary user interface for outputting a notification that alerts a user that typical activity in their vicinity would adversely impact goals of the user, in accordance with some embodiments of the present disclosure.

FIG. 6 illustrates an exemplary user interface 600 for outputting a notification or alert to a device 112 that typical activity in their vicinity would adversely impact goals of the user. Notification 602 is illustrated as a push notification, but may be any notification receivable by a user. Notification 602 may be generated by location-based alert module 335. For example, when a user enters a luxury store such as a coffee shop, notification 602 indicates the name of the luxury location. Notification 602 may also indicate a popular item sold by the luxury location (e.g., "coffee" if the luxury location is a coffee shop). Credit builder recommendation module 333 may determine the impact to the user's goal should the user purchase a given item, and include that impact (e.g., in terms of amount of time to achieve the goal) in notification 602.

Figure 7:
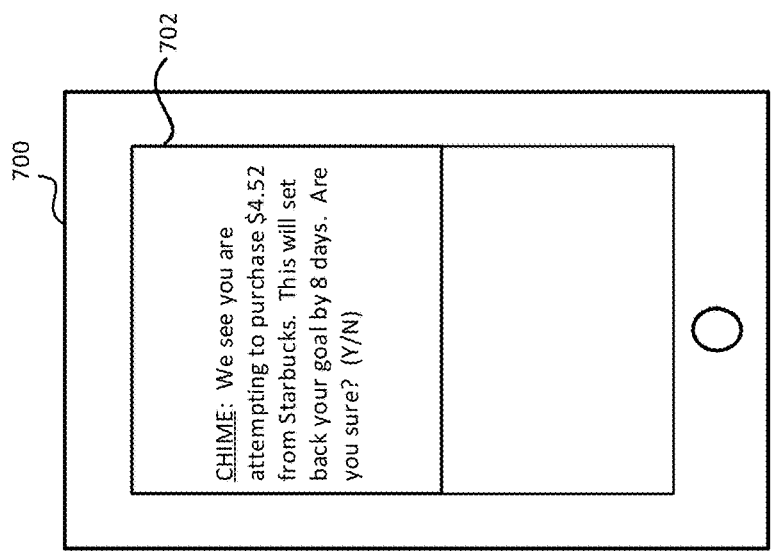
FIG. 7 illustrates an exemplary user interface for attempting to intervene in a transaction that would adversely impact goals of the user, in accordance with some embodiments of the present disclosure.

FIG. 7 illustrates an exemplary user interface 700 for attempting to intervene in a transaction that would adversely impact goals of the user. Notification 702 is illustrated as a push notification, but may be any notification receivable by a user. Notification 702 may be generated by attempted transaction-based alert module 336. Notification 702 may be populated with information received from an attempted location, such as a purchase amount, purchase location, item identifier, etc. Notification 702 may also include additional information, such as an impact to the user's ability to achieve his or her goal (e.g., in terms of time delay if the item is purchased). Notification 702 may include an option to authorize or cancel the transaction. A user may thus use notification 702 to nullify, e.g., an impulse purchase of a luxury item, before the transaction is complete.

In one embodiment, marketing incentives may be employed to reward or encourage the user 110 when they have implemented activities that meet or approach their goal. For example, credit builder system 150 may reward a user for each increase in credit by a certain number of points or by a percentage or subset of the required increase to meet their stated goal. The application of such incentives is shown in FIG. 4 as steps 420 and 422 (optional to process 400 as indicated by the dashed lines). An automatic rules-based implementation is used to determine whether a user meets certain thresholds of progress towards their goal (step 420), and when a threshold is met (Y in step 420), a financial or experiential reward is given (step 422), in comparison to conventional systems where rewards cards offer tiers of rewards based on customer spend. By these means, credit builder system 150 may provide a personalized, rewards-based feedback to users to identify and incentivize financial health, separate from and/or in additional to other reports or notifications. Where a threshold value has not been met (N in step 420), process 400 continues as normal to step 424.

Credit builder system 150 may grant such a reward to the user by, e.g., applying the reward to the user account or transmitting the reward (or a record associated therewith) to a user, via app notification, text, e-mail, traditional mail service, or any other appropriate method. As one example of a "reward", credit builder system 150 may deposit a certain dollar value in the user's account with consumer banking service 180. Alternately, the reward may be a gift certificate or redeemable code, a savings, discount code, or coupon, or a non-monetary item just as a message, badge, icon, or other digital recognition that may be associated with a user's account or with a third-party social media account.

In another embodiment, the processes described with regard to steps 420 and 422 can be applied outside of the recommendation process 400. That is, credit builder system 150 may contain one or more logics configured to evaluate whether a user 110 (or a client holder of an account with consumer banking service 180, even where no client device 112 is used), has met a certain threshold of financial health or user activity that would qualify the user for a reward or incentive. As one example, credit builder system 150 evaluates a percentage of the user's spend within the system of a particular banking entity (consumer banking service 180), and a dollar value reward may be deposited per month if most of a user's spending is done using financial instrument 114 issued by that banking entity. Rather than a global rule, the credit builder system 150 may apply user-specific rules, where the "tiers" for rewards are determined based on the particular user's savings, spend, credit increase, or the like. In an exemplary embodiment, credit builder system 150 obtains a daily credit score or report for a user from third party database 170, and that credit score is used to determine the user's immediate dollar rewards, if any. In other embodiments, rather than a daily inquiry or evaluation, the system may determine whether the user has met a designated threshold periodically or at a scheduled time, or such determination may be triggered by the occurrence of a particular event, such as a quota of transactions or a particular balance.

Figure 8:
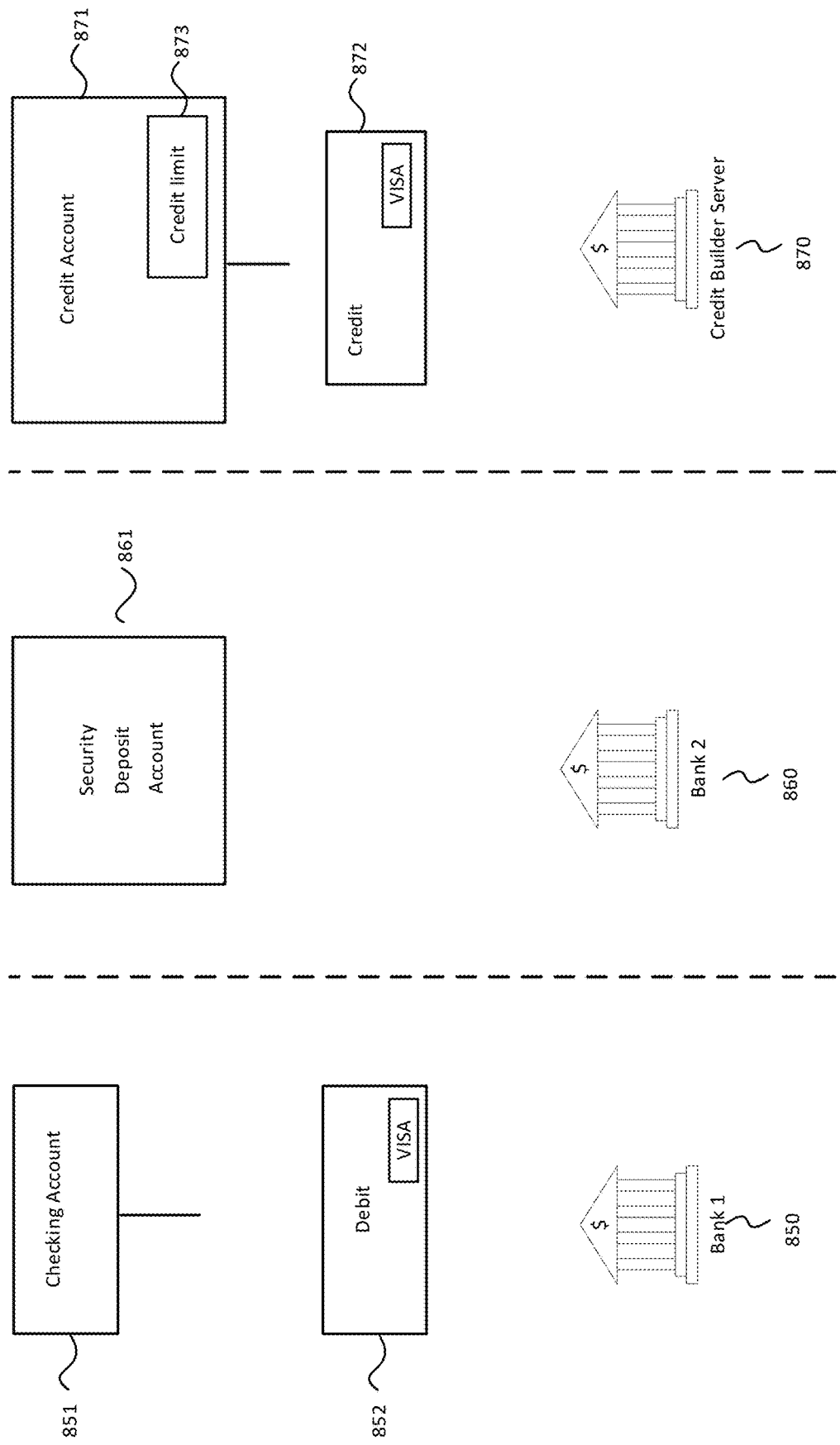
FIG. 8 illustrates an exemplary configuration for adjusting a credit limit provided by the credit builder system, in accordance with some embodiments of the present disclosure.

In some embodiments, as shown in exemplary FIG. 8, a credit builder system may act to adjust a credit limit provided by a consumer banking service to the user. Exemplary bank 850 (in some embodiments, consumer banking service 180) represents a banking institution with which a user has a checking account 851. The user may use a debit card 852 to access or spend funds from checking account 851. However, use of the checking account 851 does not substantially affect the user's credit score, as the user is not drawing from a credit limit. Therefore, no history of responsible use of credit by the user has been developed by virtue of having checking account 851 with bank 850. In order to build a credit limit, while avoiding spending money that the user does not have, the user may open a secured charge card 872 with credit builder server 870 (which has the various functionalities of credit builder system 150 described above). Secured charge card 872 draws from credit account 871, which has a credit limit 873. Credit limit 873 is increased by credit builder server 870, either directly or proportionately to an amount of funds transferred from checking account 851 to credit account 871. Credit limit 873 is decreased by credit builder server 870, either directly or proportionately, either by an amount of funds spent using secured charge card 872, or a transfer of funds from credit account 871 to checking account 851.

In a conventional solution, traditional money transfers take several days to process because the speed of money transfers is restricted by the federal reserve. In contrast, by implementing an embodiment as described above with regard to FIG. 8, funds have the appearance to the user of transferring in real-time or near real-time between checking account 851 and credit account 871 by using an intermediary account, such as security deposit account 861 through bank 860. For example, to transfer $100 immediately from checking account 851 to credit account 871, a federal reserve transfer may occur between checking account 851 and security deposit account 861, where the funds will be held in security deposit account to ensure that the $100 of credit added to credit limit 873 is secured by capital that will eventually be processed. Security deposit account 861 may also be used to facilitate real-time transfers from checking account 871 to checking account 851, where the user receives access at their checking account 851 immediately, but credit builder server 870 holds the funds in the intermediary security deposit account 861 while the transfer takes place, and where credit limit 873 is reduced at the outset of the transfer.

In some embodiments, because credit limits are reduced as funds are spent, and keeping a credit limit high is important to improving credit of a user, funds are automatically transferred from checking account 851 of a user to their credit account 871. The automatic transfer may be a feature that the user opts into (e.g., using user interface module 331). The automatic transfer may occur to replace funds as they are spent. In an embodiment, one or more machine learning models stored in model database 343 are used by credit builder server 870 to determine an amount of funds to transfer to optimize a credit limit for improving a credit score to a point corresponding to a goal of the user, where the amount of funds varies dynamically as circumstances change over time. Credit builder server 870 may monitor checking account 851 to identify deposits (e.g., as payroll deposits, or other recurring streams of income), and identifies patterns in the deposits to better optimize the amount to transfer. This may, in some embodiments, by done through the application of one or more learning algorithms.

The systems and methods described above with reference to FIGS. 1-11 allow an automated banking system to provide to its user in real-time specific, actionable steps (recommendations) that a user can take to reach a desired financial goal, even where the specific mechanisms or rules by which the actions may function to improve the user's financial health are unknown to the user. The banking system may additionally, through monitoring and use of machine learning models, provide continually updated recommendations based on user activity. The systems and methods described herein provide several technical advantages and benefits over conventional solutions. Because the particular mechanisms that impact credit score may change over time, the systems and methods described herein can inform users and perform actions over digital channels with regard to money movement and management based on the implications of datasets and rules that are too large and complex for real-time evaluation solely by human minds or on pen and paper, or in some cases even using deterministic computing algorithms. Unlike conventional "recommendations" made by human tellers or advisors at banks, a human does not need to intercede or make any deliberated decision for the systems described herein to act upon items identified to be in furtherance of the user's goals. Further, the solutions herein provide notifications to users in real-time, prior to and at the time of their activity (e.g., purchases) whether or not such activity works towards complex financial goals. Further, through analysis of digital information on a client device, the systems and methods described herein may handshake with third-party applications or software to determine specific, actionable income sources that offer additional income capabilities, and can prompt the user with such information. By these means, beneficially, this technical solution leverages application information on the user's device to achieve timely push notifications tailored to scenarios determined from third party database information. Further, through automatic monitoring of user accounts and subscriptions, the systems and methods described herein are able to automatically determine whether and when to manipulate a user's credit limit for a secured charge card, and to automatically transfer funds based on such determinations.

Throughout this disclosure, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations. Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations. The one or more processors may also operate to support performance of the relevant operations in a "cloud computing" environment or as a "software as a service" (SaaS) or located in a single geographic location (e.g., within a home environment, an office environment, or a server farm). For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed merely for convenience to describe elements and components of the embodiments herein, and not as a separate limitation or definition. This description should be read to include one or at least one and the singular also includes the plural unless it is obvious that it is meant otherwise.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system comprising:
   a communications interface capable of receiving data from a client device;
   a memory configured to store information identifying a plurality of user accounts and, in association with each of the plurality of user accounts, (i) activity data relating to historical activity on the account and (ii) financial data associated with an account holder, the financial data comprising a credit score of the account holder; and
   at least one processor configured to:
   train one or more machine learning models based on a training set of data derived from the activity data and financial data stored in the memory;
   receive goal data from the client device via the communications interface, the goal data corresponding to at least one user account of the plurality of user accounts and comprising a user-defined goal and a desired timeline for achieving the user-defined goal, wherein a user of the client device is an account holder of the at least one user account;
   obtain, from the memory, activity data associated with the at least one user account;

obtain financial data associated with the user of the client device from a third party server located remotely from the system, the obtained financial data comprising a credit score of the user of the client device;

receive, in real time, activity data indicative of a transaction being attempted by the user;

apply the one or more machine learning models to a data set comprising the obtained activity data, the obtained financial data, the received goal data, and the activity data indicative of the transaction to predict an impact of the transaction to the user-defined goal;

generate a recommendation regarding the transaction based on the predicted impact;

transmit the generated recommendation regarding the transaction to the client device via the communications interface prior to completion of the transaction;

apply the one or more machine learning models to a dataset comprising the obtained activity data, the obtained financial data, and the received goal data, to identify a set of potential user activities for improving the credit score of the user based on the received goal data;

generate one or more recommendations of user activity for improving the credit score of the user based on the identified set of potential user activities;

identify a plurality of applications installed on the client device;

determine an application of the plurality of applications that corresponds to income generation; and include, in the one or more recommendations of user activity, a recommendation to use the application to achieve further income.

2. The system of claim 1, wherein the at least one processor is further configured to:

perform, based on the recommendation regarding the transaction, at least one of the following actions: transferring money to or from the at least one user account, disputing a charge associated with the at least one user account, or denying a withdrawal associated with the at least one user account.

3. The system of claim 1, wherein the at least one processor is further configured to:

monitor user activity associated with the user of the client device;

determine, from the monitored user activity, that a change of circumstance relating to the user of the client device has occurred;

update the recommendation regarding the transaction based on the change of circumstance; and transmit the updated recommendation regarding the transaction to the client device via the communications interface.

4. The system of claim 3, wherein the updating of the recommendation regarding the transaction comprises re-applying the one or more machine learning models to a dataset comprising data associated with the change of circumstance.

5. The system of claim 3, wherein the at least one processor is further configured to:

determine, from the monitored user activity, that the user of the client device has entered a luxury goods location;

obtain merchant data stored in the memory associated with the luxury goods location;

determine, based on the obtained merchant data and the user-defined goal, a potential impact to the user-defined goal; and transmit, to the client device via the communications interface, an instruction to output a push notification referencing the determined potential impact to the user-defined goal.

6. The system of claim 1, wherein the at least one processor is further configured to:

monitor user activity associated with the user of the client device;

determine, from the monitored user activity, that the credit score of the user of the client device exceeds a predetermined threshold value; and perform, based on the determination, at least one of the following actions: transferring a monetary reward to the at least one user account, or transmitting a notification to the client device via the communications interface.

7. The system of claim 1, wherein the recommendation regarding the transaction is a human-readable recommendation comprising a character string.

8. The system of claim 1, wherein the generated recommendation regarding the transaction is displayed on a user interface of the client device.

9. The system of claim 1, wherein the one or more machine learning models include an algorithm for clustering the data set into groups of user accounts with data similarities.

10. The system of claim 1, wherein the transaction is a purchase transaction.

11. A method comprising:

training one or more machine learning models based on a training set of data derived from, for each of a plurality of user accounts, (i) activity data relating to historical activity on the account and (ii) financial data associated with an account holder, the financial data comprising a credit score of the account holder;

receiving goal data from a client device, the goal data corresponding to at least one user account of the plurality of user accounts and comprising a user-defined goal and a desired timeline for achieving the user-defined goal, wherein a user of the client device is an account holder of the at least one user account;

obtaining activity data associated with the at least one user account;

obtaining financial data associated with the user of the client device, the obtained financial data comprising a credit score of the user of the client device;

receiving, in real time, activity data indicative of a transaction being attempted by the user;

applying the one or more machine learning models to a data set comprising the obtained activity data, the obtained financial data, the received goal data, and the activity data indicative of the transaction to predict an impact of the transaction to the user-defined goal;

generating a recommendation regarding the transaction based on the predicted impact;

transmitting the generated recommendation regarding the transaction to the client device prior to completion of the transaction;

applying the one or more machine learning models to a dataset comprising the obtained activity data, the obtained financial data, and the received goal data, to identify a set of potential user activities for improving the credit score of the user based on the received goal data;

generating one or more recommendations of user activity for improving the credit score of the user based on the identified set of potential user activities;

identifying a plurality of applications installed on the client device;

determining an application of the plurality of applications that corresponds to income generation; and including, in the one or more recommendations of user activity, a recommendation to use the application to achieve further income.

12. The method of claim 11, further comprising:

performing, based on the recommendation regarding the transaction, at least one of the following actions: transferring money to or from the at least one user account, disputing a charge associated with the at least one user account, or denying a withdrawal associated with the at least one user account.

13. The method of claim 11, further comprising:

monitoring user activity associated with the user of the client device;

determining, from the monitored user activity, that a change of circumstance relating to the user of the client device has occurred;

updating the recommendation regarding the transaction based on the change of circumstance; and transmitting the updated recommendation regarding the transaction to the client device.

14. The method of claim 13, wherein the updating of the recommendation regarding the transaction comprises re-applying the one or more machine learning models to a dataset comprising data associated with the change of circumstance.

15. The method of claim 13, further comprising:

determining, from the monitored user activity, that the user of the client device has entered a luxury goods location;

obtaining merchant data associated with the luxury goods location;

determining, based on the obtained merchant data and the user-defined goal, a potential impact to the user-defined goal; and transmitting, to the client device, an instruction to output a push notification referencing the determined potential impact to the user-defined goal.

16. The method of claim 11, further comprising:

monitoring user activity associated with the user of the client device;

determining, from the monitored user activity, that the credit score of the user of the client device exceeds a predetermined threshold value; and performing, based on the determination, at least one of the following actions: transferring a monetary reward to the at least one user account, or transmitting a notification to the client device.

17. The method of claim 11, wherein the recommendation regarding the transaction is a human-readable recommendation comprising a character string.

18. The method of claim 11, wherein the one or more machine learning models includes an algorithm for clustering the data set into groups of user accounts with data similarities.

\* \* \* \* \*